US008385260B2

(12) United States Patent
Takakura et al.

(10) Patent No.: US 8,385,260 B2
(45) Date of Patent: Feb. 26, 2013

(54) WIRELESS BASE STATION, COMMUNICATION SYSTEM, BELONGING INFORMATION MANAGEMENT METHOD AND STORAGE MEDIUM FOR STORING PROGRAM

(75) Inventors: Yoshiaki Takakura, Tokyo (JP); Kenichi Abe, Tokyo (JP); Tetsuya Ito, Tokyo (JP); Akira Matsumoto, Tokyo (JP); Hiroyuki Iizuka, Tokyo (JP); Yuichiro Ezure, Tokyo (JP)

(73) Assignee: NEC Communications Systems, Ltd., Tokyo (JP)

( * ) Notice: Subject to any disclaimer, the term of this patent is extended or adjusted under 35 U.S.C. 154(b) by 961 days.

(21) Appl. No.: 12/329,731

(22) Filed: Dec. 8, 2008

(65) Prior Publication Data

US 2009/0149222 A1    Jun. 11, 2009

(30) Foreign Application Priority Data

Dec. 6, 2007   (JP) .................. 2007-316120

(51) Int. Cl.
  *H04B 1/00*   (2006.01)
  *H04L 12/28*   (2006.01)
(52) U.S. Cl. ...................... 370/328; 370/350
(58) Field of Classification Search .............. 370/445, 370/447, 328, 338, 350
  See application file for complete search history.

(56) References Cited

U.S. PATENT DOCUMENTS

| 7,610,043 | B2 * | 10/2009 | Bae | 455/412.2 |
| 7,814,322 | B2 * | 10/2010 | Gurevich et al. | 713/171 |
| 7,835,301 | B1 * | 11/2010 | Maufer | 370/254 |
| 2005/0128991 | A1 * | 6/2005 | Dayanandan et al. | 370/338 |
| 2005/0243765 | A1 * | 11/2005 | Schrader et al. | 370/328 |
| 2007/0093267 | A1 * | 4/2007 | Hosono et al. | 455/561 |

FOREIGN PATENT DOCUMENTS

| JP | 2003-78937 | 3/2003 |
| JP | 2006-311549 | 11/2006 |

(Continued)

OTHER PUBLICATIONS

Hiraku Okada et al., A Low-Overhead and Low-Processing Strategy of STA Association Information for RA-OLSR in IEEE802.11s, collected papers of lecture in the Institute of Electronics, Information, and Communication Engineers General Conference, Mar. 7, 2007, ABS-1-4.

(Continued)

*Primary Examiner* — Ian N Moore
*Assistant Examiner* — Thai Nguyen
(74) *Attorney, Agent, or Firm* — Young & Thompson

(57) ABSTRACT

The present invention is to allow prompt and reliable synchronization of belonging information management table even in environments where there is a possibility of receiving update notification information from a plurality of wireless base stations, without needing unnecessarily large traffic for synchronization of belonging information management table. Wireless base station stores belonging information management table, to which belonging information of a terminal belonging to the base station is associated with, to new/old judgment information for judgment of new/old of update. Belonging information update unit performs update of belonging information including the new/old judgment information thereof. Further, upon receiving update notification information from other wireless base station, the belonging information update unit updates the belonging information management table based on the update notification information. The update notification information includes at least updated portion in the belonging information and new/old judgment information.

21 Claims, 24 Drawing Sheets

FOREIGN PATENT DOCUMENTS

JP  2007-13649  1/2007

OTHER PUBLICATIONS

Youiti Kado et al., Scalable Station Association Information Handling, Jan. 17, 2007, IEEE 802.11-06/1842r4, URL, https://mentor.ieee.org/802.11/dcn/06/11-06-1842-04-000s-scalable-station-association-information-handling.ppt.

Santosh Abraham et al.—802.11 TGs Simple Efficient Extensible Mesh (SEE-Mesh) Proposal, IEEE 802.11-0510562r0, Jun. 2005, URL, https://mentor.iccc.org/802.11/dcn/05/11-05-0562-00-000s-802-11-tgs-simple-efficient-extensible-mesh-seemesh-proposal.doc.

Japanese Official Action—2007-316120—Jul. 3, 2012.

* cited by examiner

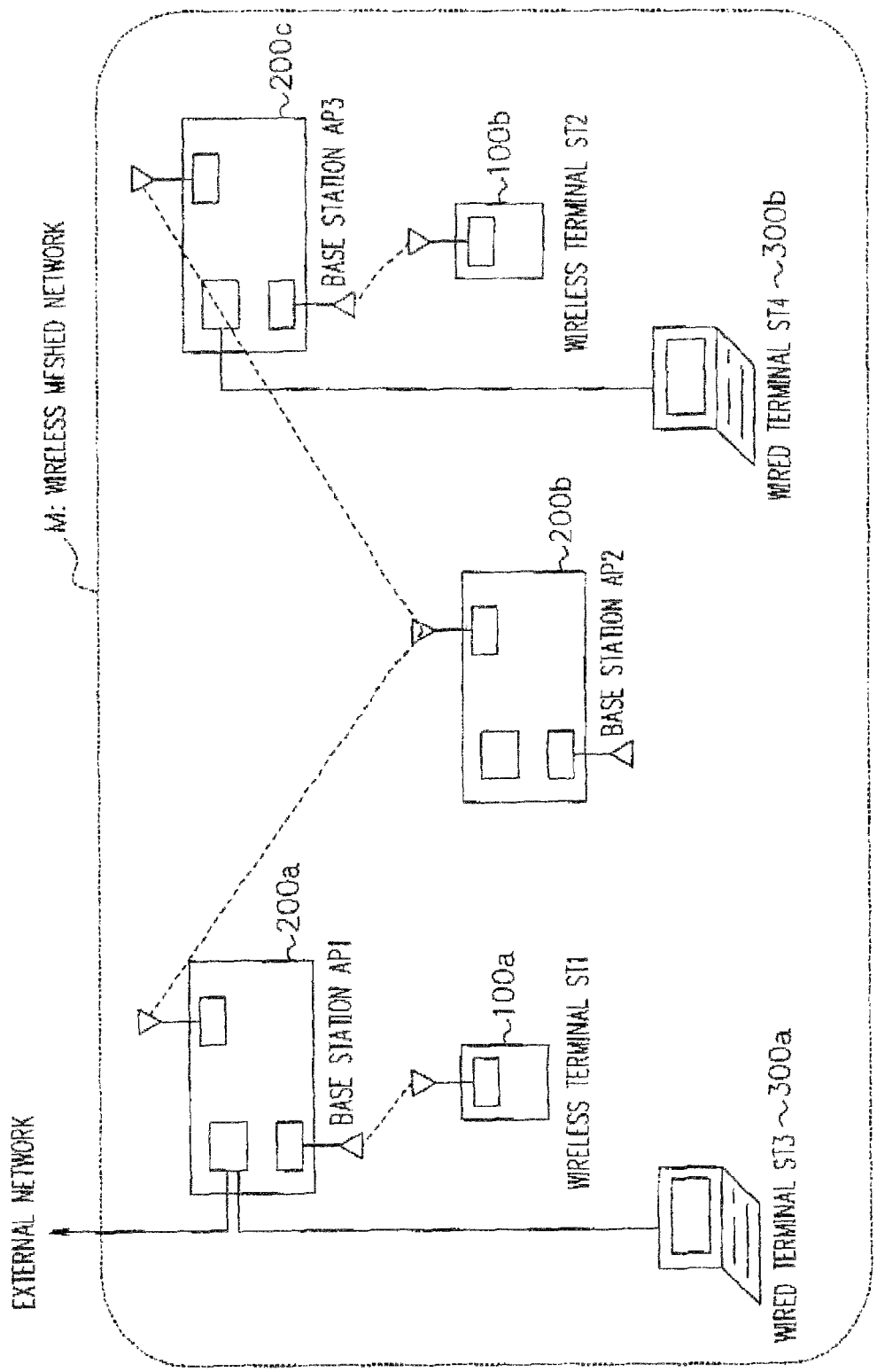
F I G. 2

FIG. 4

| APID | UPDATE NUMBER | TERMINAL ADDRESS |
|---|---|---|
| AP1 | 3 | ST1,ST3 |
| AP2 | 3 | NONE |
| AP3 | 5 | ST2,ST4 |

247, 248, 249

LAB OF AP1, LAB OF AP2, LAB OF AP3

GAB: 0

FIG. 5

| MESSAGE NAME | MESSAGE NO. |
|---|---|
| UPDATE MESSAGE | 1 |
| MOVE MESSAGE | 2 |
| NOTIFY MESSAGE | 3 |
| STATUS MESSAGE | 4 |
| DISCOVER MESSAGE | 5 |

410, 420

411, 412, 413, 414, 415

TYPE OF MESSAGE: 400

FIG. 6

| TRANSMISSION SOURCE APID | ~ 510 |
|---|---|
| DESTINATION APID = "ALL BASE STATIONS" | ~ 520 |
| TYPE OF MESSAGE = "1" | ~ 530 |
| SEQUENCE NUMBER | ~ 540 |
| UPDATE NO. | ~ 550 |
| NUMBER OF BELONGING TERMINALS | ~ 560 |
| TERMINAL ADDRESS GROUP | ~ 570 |

UPDATE MESSAGE: 500

F I G. 7
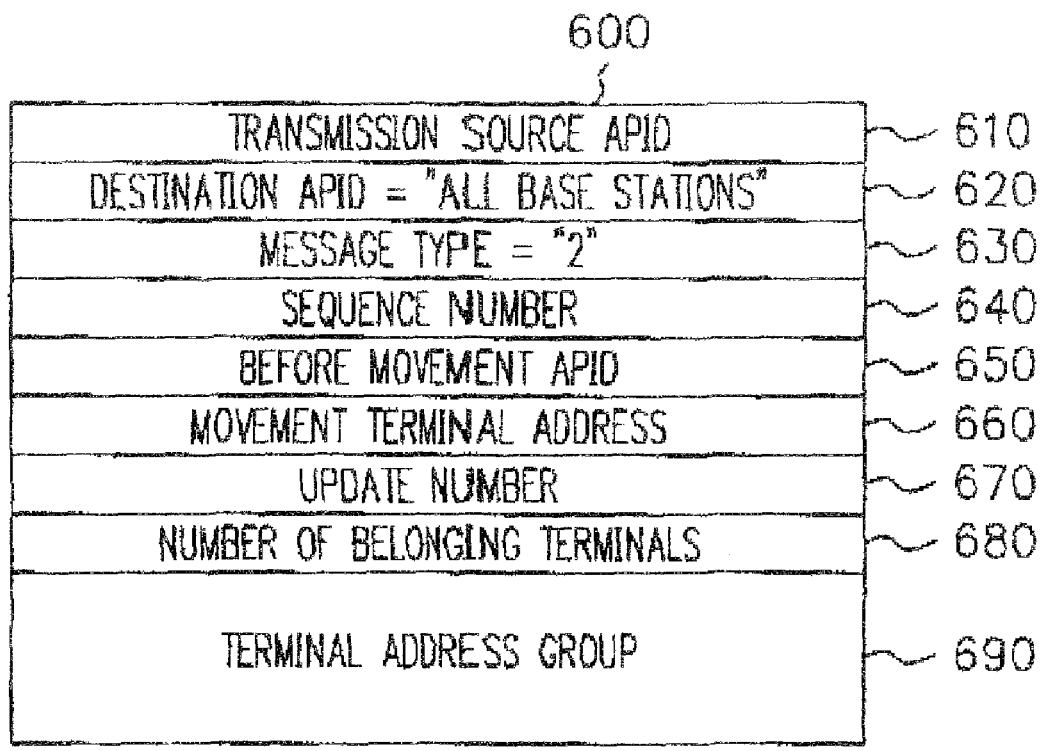
MOVE MESSAGE: 600

STATUS MESSAGE: 800

DISCOVERY MESSAGE: 900

F I G. 27
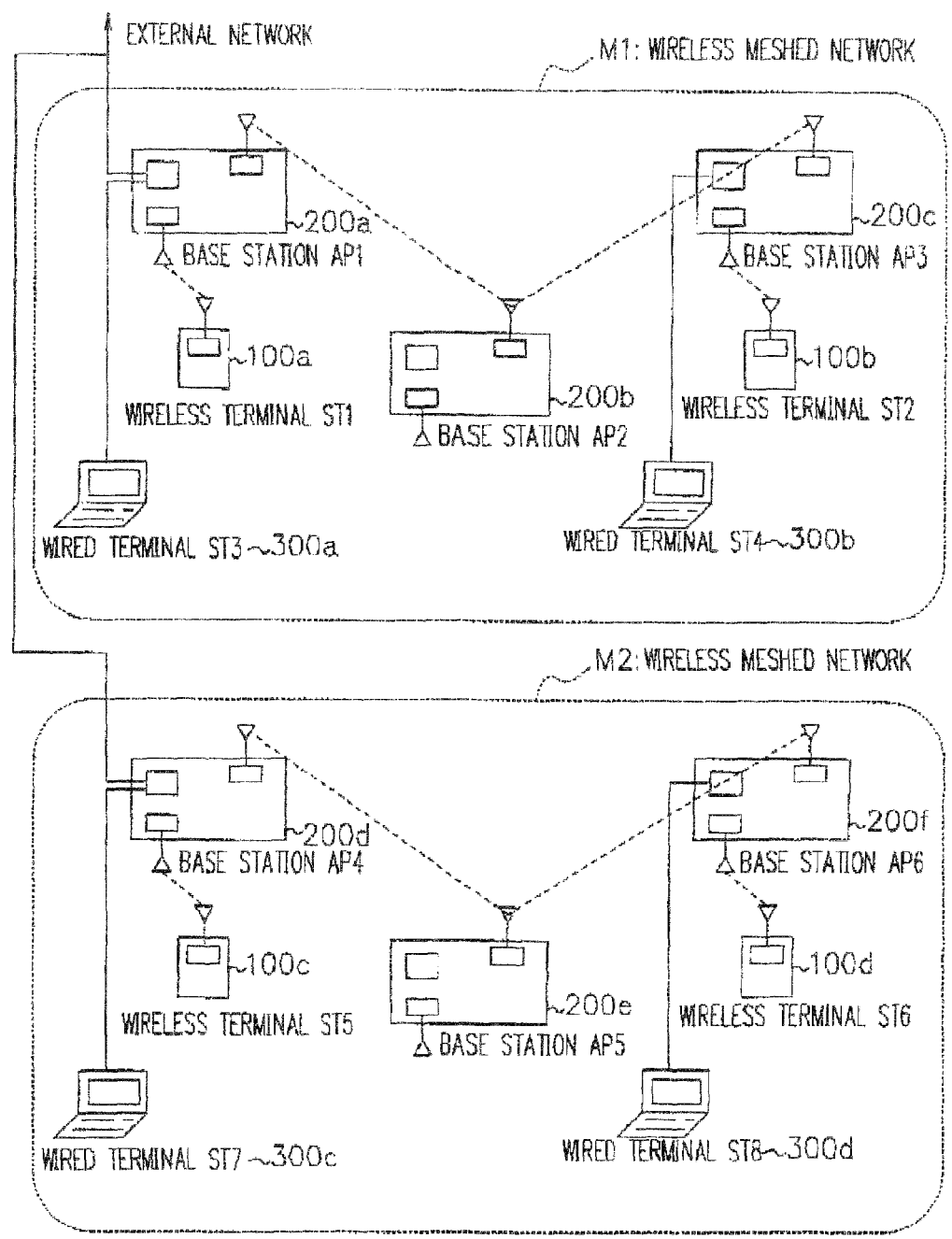

WIRELESS BASE STATION, COMMUNICATION SYSTEM, BELONGING INFORMATION MANAGEMENT METHOD AND STORAGE MEDIUM FOR STORING PROGRAM

This application is based upon and claims the benefit of priority from Japanese patent application No. 2007-316120, filed on Dec. 6, 2007, the disclosure of which is incorporated herein in its entirety by reference.

BACKGROUND OF THE INVENTION

1. Field of the Invention

The present invention relates to a wireless base station, a communication system, a belonging information management method, and a storage medium for storing a program used for, for example, wireless meshed network, communication between wireless base stations to which a wireless communication terminal belongs, and for performing transmission/receiving of management information of the terminal belonged.

2. Description of the Related Art

Wireless meshed network system is a network in which a plurality of base stations are connected by wireless communication, and a terminal belongs to any one of base stations at certain time. Belonging information is necessary to grasp to which base station belongs which terminal, while belonging information of all terminals belonging to a certain base station are referred to as LAB (Local Association Base). Further, belonging information of all base stations, that is, universal set of LAB, is referred to as GAB (Global Association Base).

In the wireless meshed network, communication between terminals is realized by that each base station has GAB. Further, notification of a change in belonging information and synchronization of GAB (belonging information management table) for managing belonging information are realized by notifying LAB routinely by LABA (Local Association Base Advertisement) message between wireless base stations.

In addition, if all base stations notify large-sized LAB routinely each other, wireless band is consumed greatly resulting in poor efficiency, and therefore, checksum diffusion mode, in which only checksum of LAB is notified by LABCA (Local Association Base Checksum Advertisement) message, is provided (see, for example, "Ad-hoc Meshed Network-Towards Realization of Ubiquitous Network Society", Corona Publishing, Sep. 20, 2007, p. 171~174, Kenichi Mase and other 1).

In recent years, wireless communication terminals, which realize a phone call through packet network using VoIP (Voice over IP), have been promulgating. For these terminals, realization of movements between base stations while maintaining communication is important for realization of smooth conversation while maintaining mobility of wireless terminals.

Further, as related technology of the present invention, such one is mentioned that in order to correspond to out-of-synchronization, parent station of a terminal parent station of which is unknown is searched using station information request frame and station information response frame (see, for example, Japanese Patent Application Laid-Open No, 2006-311549).

Further, as related technology of the present invention, such one is mentioned that buffer state synchronization signal including sequence number of a buffer and discard request message is transmitted by a base station to another base station to cause also destination base station to discard data as many as a designated number so as to synchronize data storage state in the buffer (see, for example, Japanese Patent Application Laid-Open No. 2003-78937).

Next, description will be given of the problems of the above related arts. At first, according to the method shown in "Ad-hoc Meshed Network-Towards Realization of Ubiquitous Network Society", Corona Publishing co., ltd., Sep. 20, 2007, p. 171-174, Kenichi Mase and other 1, LAB is notified every predetermined constant frequency, and therefore, there is a possibility that it takes a long time before a change in LAB due to movement of wireless terminal is reflected to GAB of other base station.

In other words, synchronization of a belonging information management table for managing belonging information does not take place before transmission frequency comes after update, and there is a possibility that communication disconnection time is generated in terminals that moved during this period of time.

Further, if transmission frequency of LAB message is shortened to shorten the communication disconnection time, unnecessary traffics needed for synchronization of the belonging information management table increase, and there is a possibility that a band is compressed unnecessarily.

Further, for the checksum diffusion mode, there is no way but wait for next notification frequency after a difference of GAB is detected and before a latest LAB is obtained, and thus time as much as one frequency is further necessary before synchronization is obtained.

Further, if communication disconnection is caused due to influences of wireless interference or the like and a plurality of differences are caused with regard to GAB of other base station due to that update of GAB is not possible for a certain period, there is no way but wait for LABA messages from a plurality of base stations. For this reason, there is a possibility further time is needed for synchronization of GAB.

Further, when all base stations perform flooding of LAB with a constant frequency, number of messages increases if seen from whole network, and there is a problem that network band is compressed.

Further, according to Japanese Patent Application Laid-Open No. 2006-311549, information of belonging terminals are managed such that wireless LAN module performs request for information about mobile station by broadcast method and its response is obtained by unicast method, unnecessary traffic for synchronization increases by broadcast at every request, and there is a possibility that the band is compressed unnecessarily.

Further, even if update information about the mobile station is received, newness of the update information can not be confirmed.

That is, the consideration given does not cover an application even to such an environment where there is a possibility for receiving update notification information from a plurality of wireless base stations such as base stations in the wireless meshed network.

Further, according to Japanese Patent Application Laid-Open No. 2003-78937, storage state of user data in a buffer is synchronized with regard to other base station by buffer state synchronization signal, and the consideration given does not cover even synchronization of the belonging information management table in an environment where there is a possibility for receiving update notification information from a plurality of wireless base stations such as base stations in the wireless meshed network.

The present invention has been developed in view of the situations and an exemplary object of the present invention is to provide a wireless base station, a communication system, a belonging information management method and a storage medium for storing a program which do not need unnecessarily large traffic generation for synchronization of a belonging information management table even for a case where a plurality of unsynchronized differences are caused and capable of synchronizing the belonging information management table promptly and reliably even in an environment where there is a possibility that update notification information is received from a plurality of wireless base stations.

SUMMARY

In order to accomplish the exemplary object, a wireless base station according to an exemplary aspect of the present invention includes a management table storage unit which stores the belonging information management table in such that belonging information of the terminal at each wireless base station is associated with new/old judgment information for judgment of new or old of the update, a belonging information update unit which updates including the new/old judgment information when the belonging information management table is updated, and a first transmission unit which transmits the update notification information including at least updated portion and the new/old judgment information in the belonging information management table to other wireless base stations in wired or wireless fashion, when the belonging information management table is updated by the belonging information update unit, wherein when the update notification information is received from other wireless base station, the belonging information update unit updates the belonging information management table based on the update notification information.

Further, a communication system according to an exemplary aspect of the present invention is composed such that a plurality of wireless base stations relating to the present invention is connected in communicapable fashion.

Further, a belonging information management method according to an exemplary aspect of the present invention includes: a first belonging information update step for updating including new/old judgment information for judgment of new or old of the update in the update information, when the belonging information management table for managing the belonging information of the terminal at each wireless base station is updated; a first transmitting step for transmitting the update notification information including at least updated portion and the new/old judgment information in the belonging information management table to other wireless base stations in wired or wireless fashion, when updated as mentioned above by the first belonging information update step; and a second belonging information update step for updating the belonging information management table based on the update notification information when the update notification information is received from other wireless base station.

Further, a storage medium for storing a belonging information management program according to an exemplary aspect of the present invention stores a program which causes a computer in the wireless base station to execute a first belonging information update processing for updating including new/old judgment information for judgment of new or old of the update in the update information, when the belonging information management table for managing the belonging information of the terminal at each wireless base station is updated, a first transmitting processing for transmitting the update notification information including at least updated portion and the new/old judgment information in the belonging information management table to other wireless base stations in wired or wireless fashion, when the update is made by the first belonging information update processing, and a second belonging information update processing for updating the belonging information management table based on the update notification information when the update notification information is received from other wireless base station.

BRIEF DESCRIPTION OF THE DRAWINGS

FIG. 2 is a block diagram showing one composition example of wireless meshed network as a first exemplary embodiment.

FIG. 4 is a drawing showing composition of GAB (D) stored in the belonging information storage unit 243.

FIG. 5 is a drawing showing types of belonging information exchange messages.

FIG. 6 is a drawing showing UPDATE message.

FIG. 7 is a drawing showing MOVE message.

FIG. 27 is a block diagram showing other example of composition of wireless meshed network.

EXEMPLARY EMBODIMENT

Next, referring to drawings, an exemplary embodiment of application of the wireless base station, communication system, belonging information management method, and storage medium for storing the program relating to the present invention to wireless meshed network system will be explained in detail.

Each of exemplary embodiments realizes, for wireless meshed network system, movements of wireless terminals between base stations with shorter communication disconnection time. Accordingly, a belonging information management method capable of performing autonomous synchronization is presented.

Figure 1:
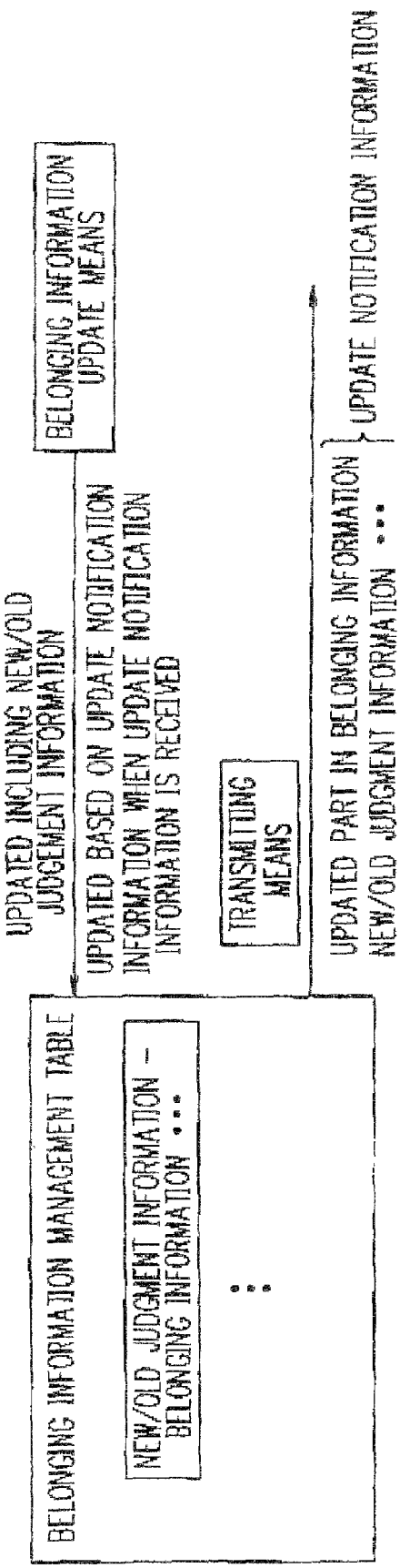
FIG. 1 is a drawing showing outline of an exemplary embodiment of the present invention.

In each exemplary embodiment of the present invention, as shown in FIG. 1, the wireless base station stores the belonging information management table, to which belonging information of the terminal belonging to the base station is associated with, to the new/old judgment information for judgment of new/old of the update.

Then, the belonging information update means performs update of belonging information including new/old judgment information thereof. Further, the belonging information update means updates the belonging information management table based on the update notification information thereof, when the update notification information is received from other wireless base stations.

The update notification information includes at least updated portion in the belonging information and new/old judgment information. This update notification information is transmitted by the transmission means.

Next, outline common to each of exemplary embodiments of the present invention will be explained.

The base station of the exemplary embodiment updates LAB in the event of new engagement and disengagement of the terminal, such as when the terminal caused handover between base stations. Further, when updated, updated LAB is immediately subjected to flooding and this is notified to all base stations included in the wireless meshed network system. With these features, a change in LAB in individual base station is developed promptly to all base stations and at the same time, synchronization of LAB between each of base stations can be made promptly.

Further, the base station of the exemplary embodiment includes in LAB "Update number" (new/old judgment information) which shows update state of LAB. With this feature, upon receiving the notification, other base station can make judgment of new or old of LAB. Further, all base stations confirm update state of GAB (belonging information management table) by exchanging periodically only "Update number" of LAB of all base stations with adjoining base station each other.

In this way, in the exemplary embodiment, only "Update number" is exchanged for confirmation of update state resulting in reduction of amount of information for synchronization confirmation. Further, since synchronization confirmation can be realized while being closed between adjoining nodes, number of messages in the network is reduced.

Further, when an arbitrary base station detects that "Update number" received from the adjoining base station is older than "Update number" being stored in GAB of own station, GAB which own station has is subjected immediately to flooding to all base stations. With this feature, GAB is immediately synchronized between all base stations.

Further, upon receiving movement notification from the wireless terminal, each base station updates LAB and at the same time, executes flooding immediately to all base stations. With this feature, movement of the terminal between base stations with fewer incidences of communication discontinuation is realized.

When parent station of a destination terminal is unknown at transmitting of a data from the terminal, searching of parent station of the destination terminal is carried out. Response to a search request is realized if the base station to which the terminal of searching object belongs executes flooding of LAB of own station to all base stations. With this feature, a result of searching is developed to all base stations and at the same time, synchronization of this LAB is made possible.

For a wired terminal, the wired terminal is automatically registered to LAB by extracting transmission source address from a data which the terminal transmits and at the same time, update of this LAB is notified and communication is made possible by flooding the LAB to all base stations.

First Exemplary Embodiment

Next, composition of a first exemplary embodiment of the present invention will be explained in detail referring to the drawings.

For the sake of simplification of explanations, hereinafter, belonging information of all terminals belonging to a certain base station is abbreviated to LAB and belonging information of all base stations, that is, universal set of LAB, is abbreviated to GAB.

FIG. 2 shows one composition example of the wireless meshed network as the first exemplary embodiment, Referring to FIG. 2, wireless meshed network M as the exemplary embodiment includes a base station AP1 (200a), a base station AP2 (200b), a base station AP3 (200c) and a wireless terminal ST1 (100a) belongs to the base station AP1 (200a), and a wireless terminal ST2 (100b) belongs to the base station AP3 (200c), respectively.

Further, a wired terminal ST3 (300a) belongs to the base station AP1 (200a), and a wired terminal ST4 (300b) belongs to the base station AP3 (200c), respectively.

The base station AP1 (200a), the base station AP2 (200b) and the base station AP3 (200c) are communicable each other in wireless fashion. The base station AP1 (200a), the base station AP (200a), the base station AP2 (200b) and the base station AP3 (200c) each transfers a communication data between terminals belonging to each according to the destination of the communication data. Transfer of the communication data is realized by manual setting or based on routing information being constructed by existing routing protocol of the wireless meshed network.

Further, in the exemplary embodiment, in order to identify the base station, an identifier is assigned to individual base station and is controlled. The identifier being assigned to the base station is abbreviated to APID. A value that is different for every base station is assigned to APID.

Meanwhile, the composition shown in FIG. 2 is a mere example of wireless meshed network, and number of base stations and number of terminals belonging thereto are not limited by FIG. 2. Further, in the exemplary embodiment, each base station is not fixed in regard to position thereof and may move arbitrarily resulting in dynamic change in the network composition.

Figure 3:
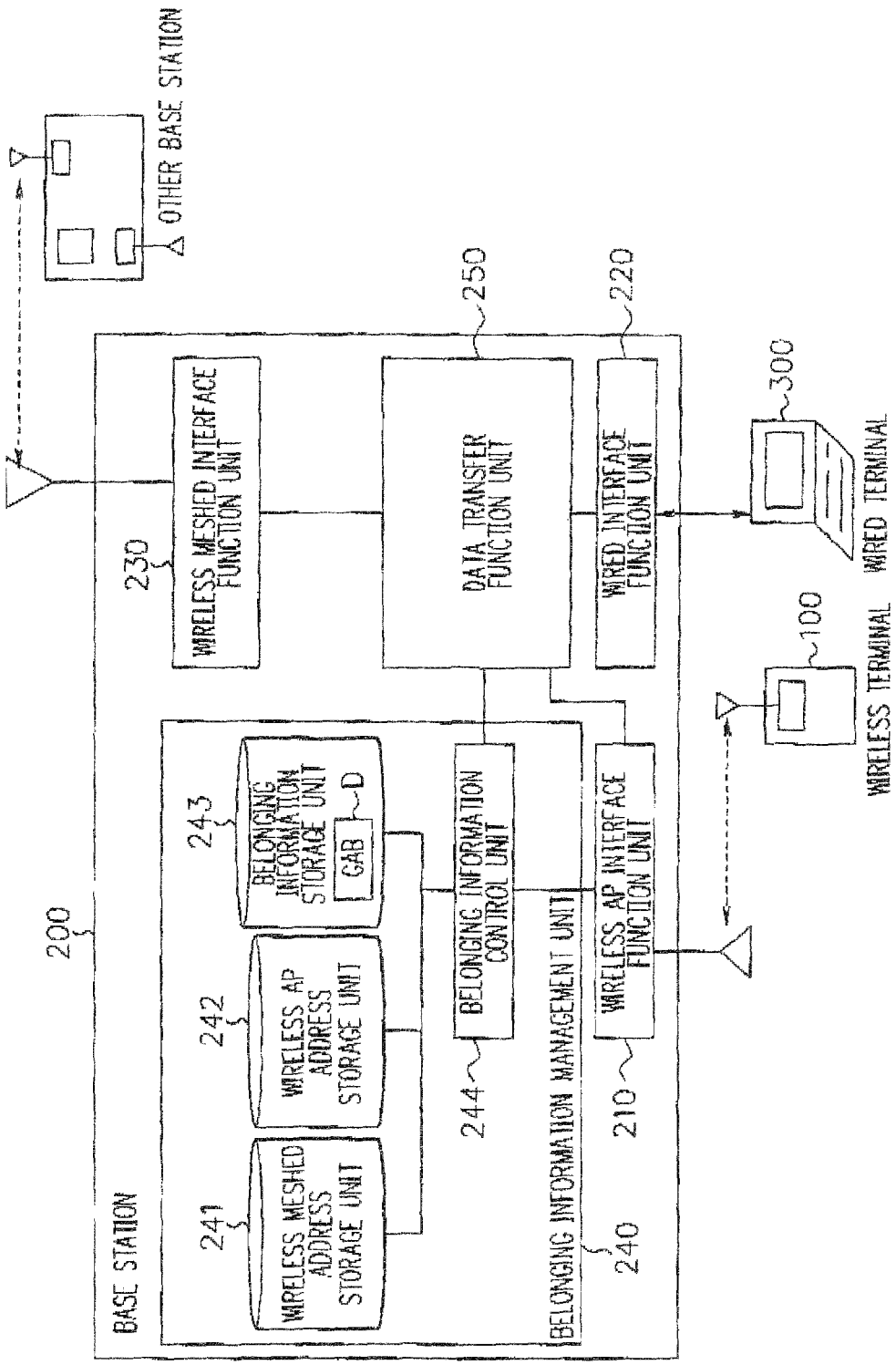
FIG. 3 is a block diagram showing composition example around base station as the first exemplary embodiment.

Next, referring to FIG. 3, the composition of the base station shown in FIG. 2 will be explained in detail. Referring to FIG. 3, a base station 200 includes a wireless AP interface function unit 210, a wired interface function unit 220, a wireless meshed interface function unit 230, a belonging information management unit 240, and a data transfer function unit 250.

The wireless AP interface function unit 210 has wireless access point function and accommodates a wireless terminal 100 by IEEE 802.11 or the like.

When a data received from the wireless terminal 100 is control message, the wireless AP interface function unit 210 terminates the message, and when it is transmission/receiving data between terminals, delivers it to the data transfer function unit 250.

Here, the control message denotes a message transmitted and received between the base station and the terminal due to engagement, disengagement and movement. For example, according to wireless LAN regulation specified in IEEE 802.11, belonging request and response thereof correspond to Association Request and Association Response, disengagement request corresponds to Disassociation or Deauthentication and movement request and response thereof correspond to Reassociation Request and Reassociation Response. The above wireless AP interface function unit 210 operates in accordance with IEEE 802.11 regulation.

However, the exemplary embodiment is not limited to IEEE 802.11 regulation, and is applicable to similar control methods in other wireless technologies. Further, when authentication is performed utilizing, for example, IEEE 802.1X regulation or the like, an authentication message may be used as a control signal.

The wired interface function unit 220 is connected to wired terminal and performs communication by IEEE 802.3 or the like. A plurality sets of wired terminals can be connected using HUB or the like and connection to the external network is also possible being connected to routers. Further, it is possible to compose one network while a plurality of wireless meshed networks is connected in wired fashion via the wired interface function unit 220.

The wireless meshed interface function unit 230 communicates with other base station 200 by IEEE 802.11 or the like.

The belonging information management unit 240 controls belonging information of the terminal. The belonging information management unit 240 includes a wireless meshed address storage unit 241, a wireless AP address storage unit 242, a belonging information storage unit 243, and a belonging information control unit 244. The wireless meshed address storage unit 241 stores correspondence of address of the wireless meshed interface function unit 230 of each base station with APID and is used to obtain destination address from APID when a data is transmitted to other base station.

The wireless AP address storage unit 242 stores correspondence of address of the wireless AP interface function unit 210 of each base station with APID and is used to obtain APID of base station thereof at movement of the terminal from the address of the wireless AP interface function unit 210 before movement.

Information to be stored in the wireless meshed address storage unit 241 and the wireless AP address storage unit 242 are set manually in advance.

The belonging information storage unit 243 stores GAB (D) that is belonging information of all terminals existing in the wireless meshed network. The belonging information control unit 244 has a function for searching, based on the address of terminals, GAB (D) being stored in the wireless meshed address storage unit 241, wireless AP address storage unit 242, and belonging information storage unit 243.

Further, the belonging information control unit 244 detects belonging, disengagement and movement of the wireless terminal 100 via the wireless AP interface function unit 210, and updates GAB (D) being stored in the belonging information storage unit 243. Further, the belonging information control unit 244 obtains transmission source address of a data which a wired terminal 300 transmits from the data transfer function unit 250, and updates GAB (D) of the belonging information storage unit 243. Further, the belonging information control unit 244 transmits/receives a belonging information exchange message with other base station 200 via the data transfer function unit 250 and the wireless meshed interface function unit 230, and updates GAB (D) of the belonging information storage unit 243 as necessary.

The data transfer function unit 250 has a function for holding routing information in the wireless message network and transferring a data transmitted/received between terminals and a data transmitted/received between base stations to an appropriate destination. For the data addressed to a terminal, the data transfer function unit 250 obtains a parent station of the addressed terminal from the belonging information management unit 240 and transfers it to an appropriate station. At data transfer between terminals, the data transfer function unit 250 extracts transmission source address of the data which the terminal transmits and conveys it to the belonging information management unit 240. The data transfer function unit 250 has a function for transferring the belonging information exchange message between the belonging information management unit 240 and other base station 200.

FIG. 4 exemplifies composition of GAB (D) to be stored in the belonging information storage unit 243 shown in FIG. 3. Referring to FIG. 4, GAB (D) that is a belonging information management table has an APID 247, an update number 248, a terminal address 249, and is composed while these are associated with each other. To the APID 247 is stored the APID of each base station. To the update number 248 is stored the update number. To the terminal address 249 are stored addresses of all terminals belonging to the base station shown by the APID 247. The update number 248 is incremented by one (1) whenever the terminal address is added to or deleted from the terminal address 249, and it is possible to compare new or old of the belonging information by comparison of small and large of the value.

For example, when the update number 248 associated with a certain APID is stored as "10" and update number of the APID in the belonging information exchange message being received from other base station is "11", the base station 200 which has received the message may judge that the information received is newer. GAB (D) is composed by LAB of all base stations in the wireless meshed network. Meanwhile, FIG. 4 exemplifies GAB (D) which each base station has for the network composition shown in FIG. 2.

FIG. 5 shows type of the belonging information exchange messages for exchange of the belonging information between base stations. Referring to FIG. 5, a message type 400 is composed of five types of messages of an UPDATE message 411 represented by message name 410, a MOVE message 412, a NOTIFY message 413, a STATUS message 414, and DISCOVERY message 415, and a value of a message number 420 for identifying individual message is assigned thereto.

According to the exemplary embodiment, as an update notification information for notifying that GAB is updated, these UPDATE message 411, MOVE message 412, NOTIFY message 413 are transmitted from the base station to other base stations to perform synchronization of GAB of each base station.

Meanwhile, the message number 420 is one example in the exemplary embodiment and any item other than the number may be used as long as it could identify the message.

FIG. 6 exemplifies UPDATE message (table update notification information), An UPDATE message 500 includes a transmission source APID 510, a destination APID 520, a message type 530, a sequence number 540, an update number 550, a number of belonging terminals 560, and a terminal address group 570.

To the transmission source APID 510 is stored an APID of transmission source of the message, and to the destination APID 520 is stored a specifically reserved APID showing all base stations. To the message type 530 is stored a value "1" showing UPDATE message as shown in FIG. 5. To the sequence number 540 is stored sequence number of the message. To the update number 550 is stored update number of LAB of the base station that is message transmission source. To the terminal address group 570 are stored addresses of all terminals belonging to the message transmission source base station and to the number of belonging terminals 550 is stored the number thereof.

UPDATE message is used to notify LAB to other base stations when, in a certain base station, a change is made to belonging information of the base station, that is, when LAB is changed, and is sent to all other base stations by flooding.

FIG. 7 exemplifies MOVE message (movement notification information). MOVE message 600 includes a transmission source APID 610, a destination APID 620, a message type 630, a sequence number 640, a before movement APID 650, a movement terminal address 660, an update number 670, a number of belonging terminals 680, and a terminal address group 690.

To the destination APID 620 is stored a specifically reserved APID showing all base stations. To the message type 630 is stored a value "2" showing MOVE message. To the movement terminal address 660 is stored address of a terminal being moved to a base station of the message transmission source and to the before movement APID 650 is stored. APID of the base station to which the terminal belonged before movement.

MOVE message is used when a base station to which a wireless terminal belongs is changed due to movement thereof and is sent from a newly belonged base station to all other base stations by flooding.

Figure 8:
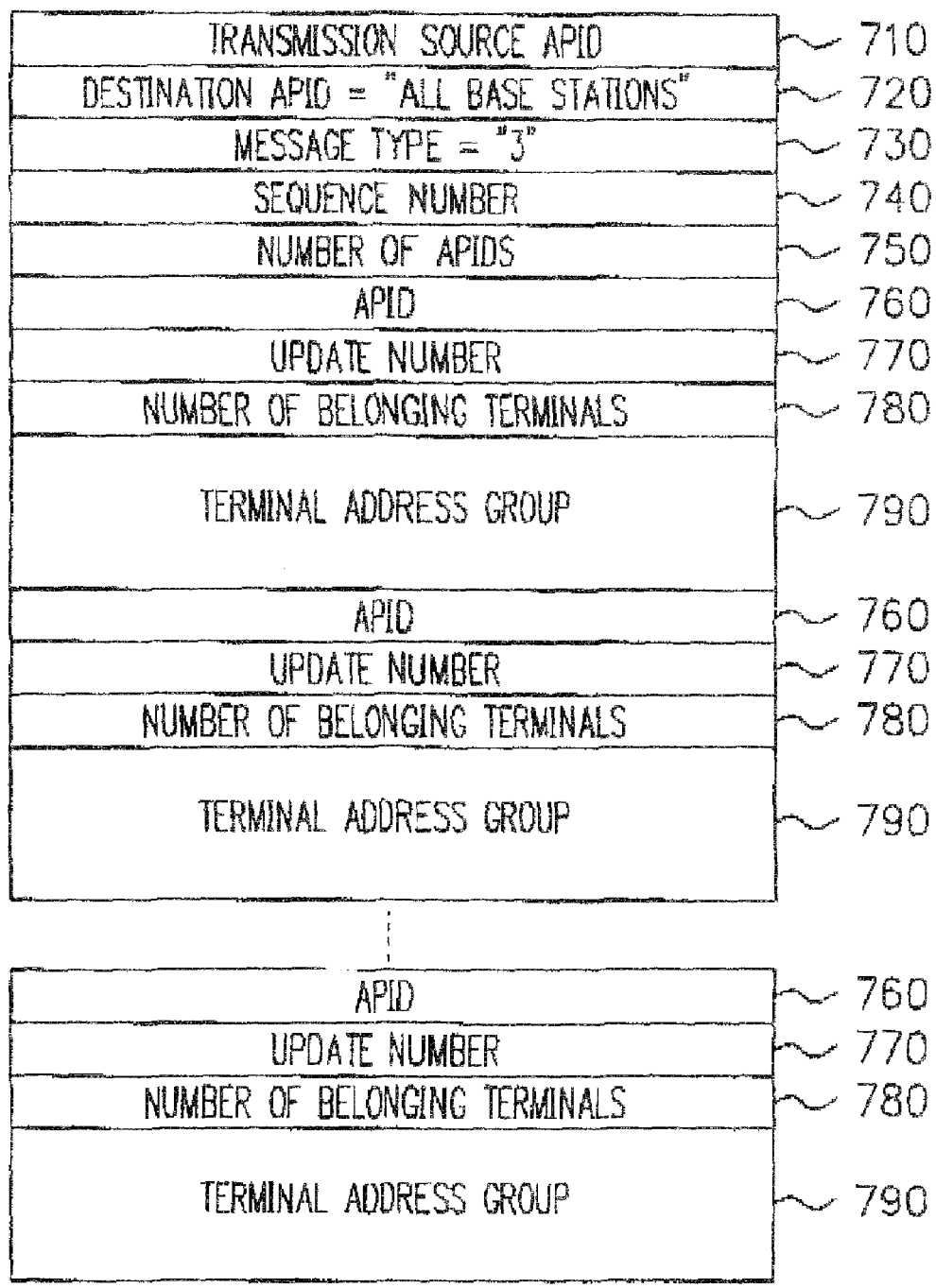
FIG. 8 is a drawing showing NOTIFY message.

FIG. 8 exemplifies NOTIFY message (general notification information). A NOTIFY message 700 includes a transmission source APID 710, a destination APID 720, a message type 730, a sequence number 740, a number of APID 750, an APID 760, an update number 770, a number of belonging terminals 780, and a terminal address group 790.

To the destination APID 720 is stored specifically reserved APID showing all base stations. To the message type 730 is stored a value "3" showing NOTIFY message. To the number of APID 750 is stored a number of all APIDs included in GAB stored in the transmission source base station, and the APID 760, the update number 770, the number of belonging terminals 780, and the terminal address group 790 are stored repeatedly in the message as many as the value which the number of APID 750 shows. To the APID 760 is stored APID, and to the subsequent update number 770, the number of belonging terminals 780 and terminal address group 790 are stored update number of LAB of the base station, the number of terminal address, and the terminal address which the APID 760 shows.

The NOTIFY message is used when an arbitrary base station conveys GAB (D) stored in the own station to other base stations and is sent to all other base stations by flooding.

Figure 9:
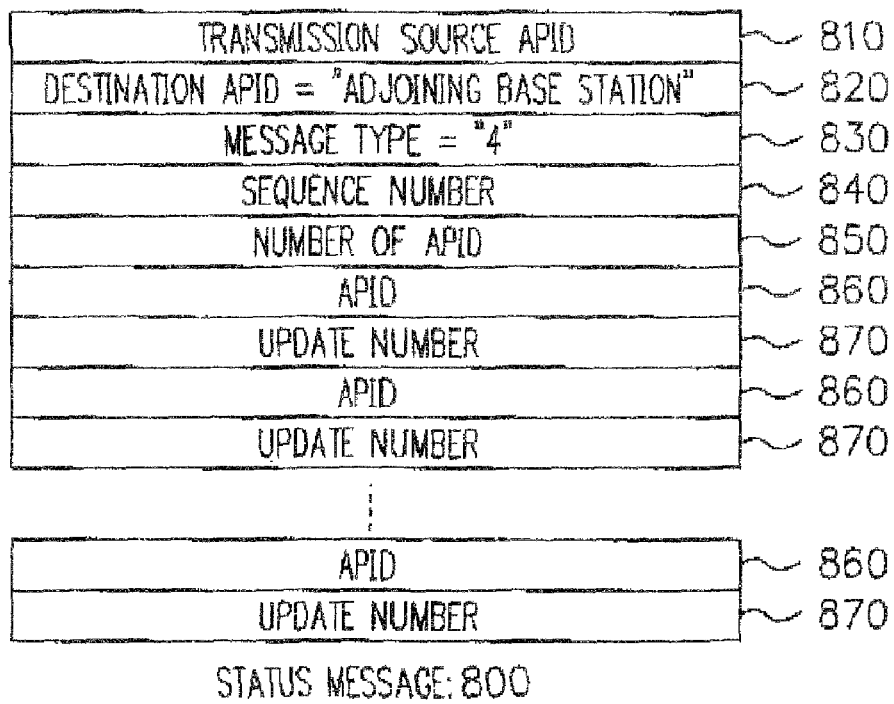
FIG. 9 is a drawing showing STATUS message.

FIG. 9 exemplifies STATUS message (periodical transmission information). A STATUS message 800 includes a transmission source APID 810, a destination APID 820, a message type 830, a sequence number 840, a number of APID 850, an APID 860 and an update number 870.

To the destination APID 820 is stored a specifically reserved APID showing an adjoining base station. To the message type 830 is stored a value "4" showing STATUS message. To the number of APID 850 is stored the number of all APIDs included in GAB (D) stored in the transmission source base station, and the APID 860, the update number 870 are stored repeatedly in the message as many as the value which the number of APID 850 shows. To the APID 860 is stored the APID, and to the subsequent update number 870 is stored update number of LAB of the base station which the APID 860 shows.

The STATUS message is used when all update numbers included in GAB (D) stored in a certain base station are conveyed to other base station and are sent from each of base stations periodically with a predetermined constant frequency to all adjoining base stations, that is, to all base stations transmittable in wired or wireless fashion without going through other stations, in the form of broadcast.

In this way, the STATUS message is composed of information about each of base stations while update number of LAB is associated to APID. That is, the composition used does not include the information of bulky data amount such as the terminal addresses. For this reason, even when STATUS message is transmitted periodically in the form of flooding, network, traffic is not compressed by unnecessarily large data amount and reliable update confirmation can be made with smaller amount of data communication.

Figure 10:
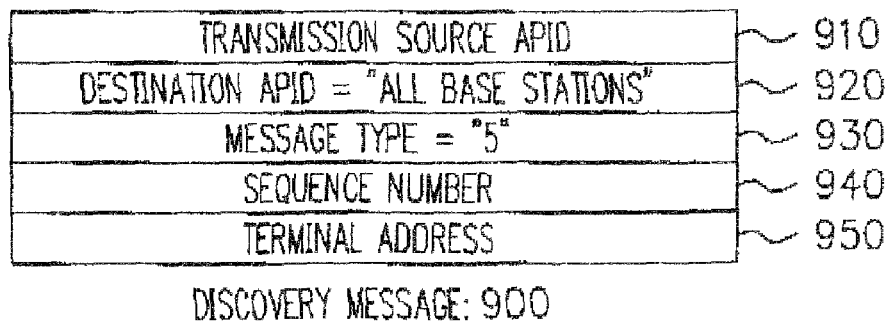
FIG. 10 is a drawing showing DISCOVERY message.

FIG. 10 exemplifies a DISCOVERY message (search request information). A DISCOVERY message 900 includes a transmission source APID 910, a destination APID 920, a message type 930, a sequence number 940, and a terminal address 950.

To the destination APID 920 is stored a specific APID showing all base stations. To the message type 930 is stored a value "5" showing DISCOVERY message. To the terminal address 950 is stored an address of searching target terminals.

The DISCOVERY message is used to check to which base station a certain terminal belongs and is sent to all other base stations by flooding.

Next, referring to drawings, operations of the wireless meshed network system as the exemplary embodiment will be explained in detail.

Figure 11:
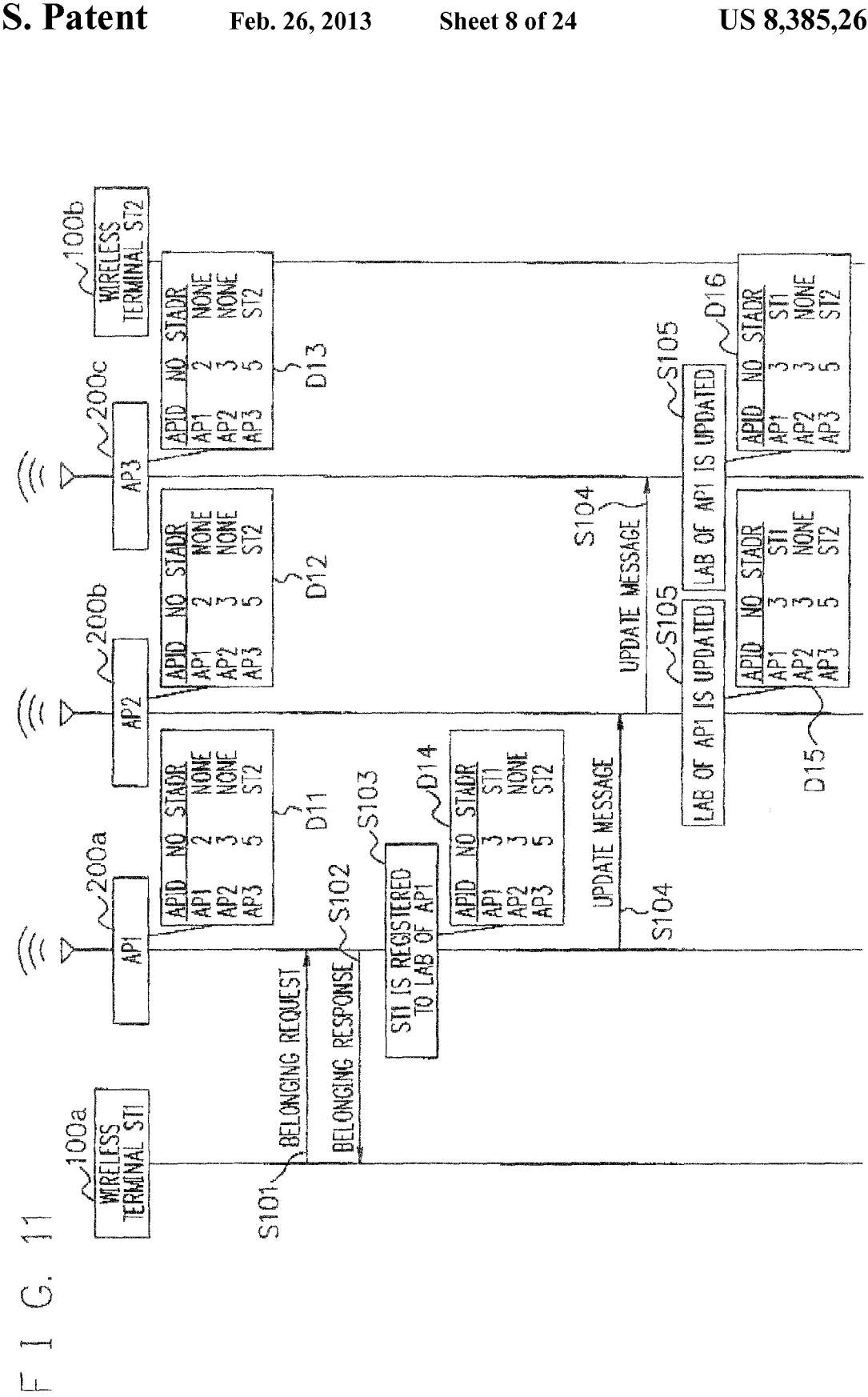
FIG. 11 is a sequence diagram showing example of operation of wireless meshed network as the first exemplary embodiment.

A sequence chart shown in FIG. 11 shows methods of notification and update of belonging information when wireless terminal ST1 (100*a*) belongs to AP1 (200*a*). In FIG. 11, D11 through D16 show GAB (D) which the base stations AP1 (200*a*), AP2 (200*b*) and AP3 (200*c*) have at each point of time, respectively. In each GAB (D) shown below, update number is abbreviated to "No" and terminal address to "STADR".

First, the wireless terminal ST1 (100*a*) transmits a belonging request (S101) to the AP1 (200*a*). Upon receiving the belonging request (S101), the AP1 (200*a*) transmits a belonging response (S102) to the wireless terminal ST1 (100*a*). Next, the AP (200*a*) registers the terminal address "ST1" of the wireless terminal ST1 (100*a*) to terminal address column (STADR) of LAB of APID="AP1", that is LAB of own station, and updates the update number (No) from "2" to "3" (S103). As a result, GAB of the AP1 (200*a*) becomes D14.

Next, AP1 (200*a*) generates UPDATE message from LAB of APID="AP1" that is own station LAB and notifies it to all other base stations by flooding (S303). Upon receiving the UPDATE message (S104), AP2 (200*b*) and AP3 (200*c*) update the update number (No) and terminal address column (STADR) of APID="AP1" of GAB (D) of the own station based on LAB included in UPDATE message (S104) (S105).

By foregoing operations, address "ST1." of the wireless terminal ST1 (1000*a*) is registered to LAB of APID="AP1" for GAB (D) of all base stations (D14, D15, D16).

Figure 12:
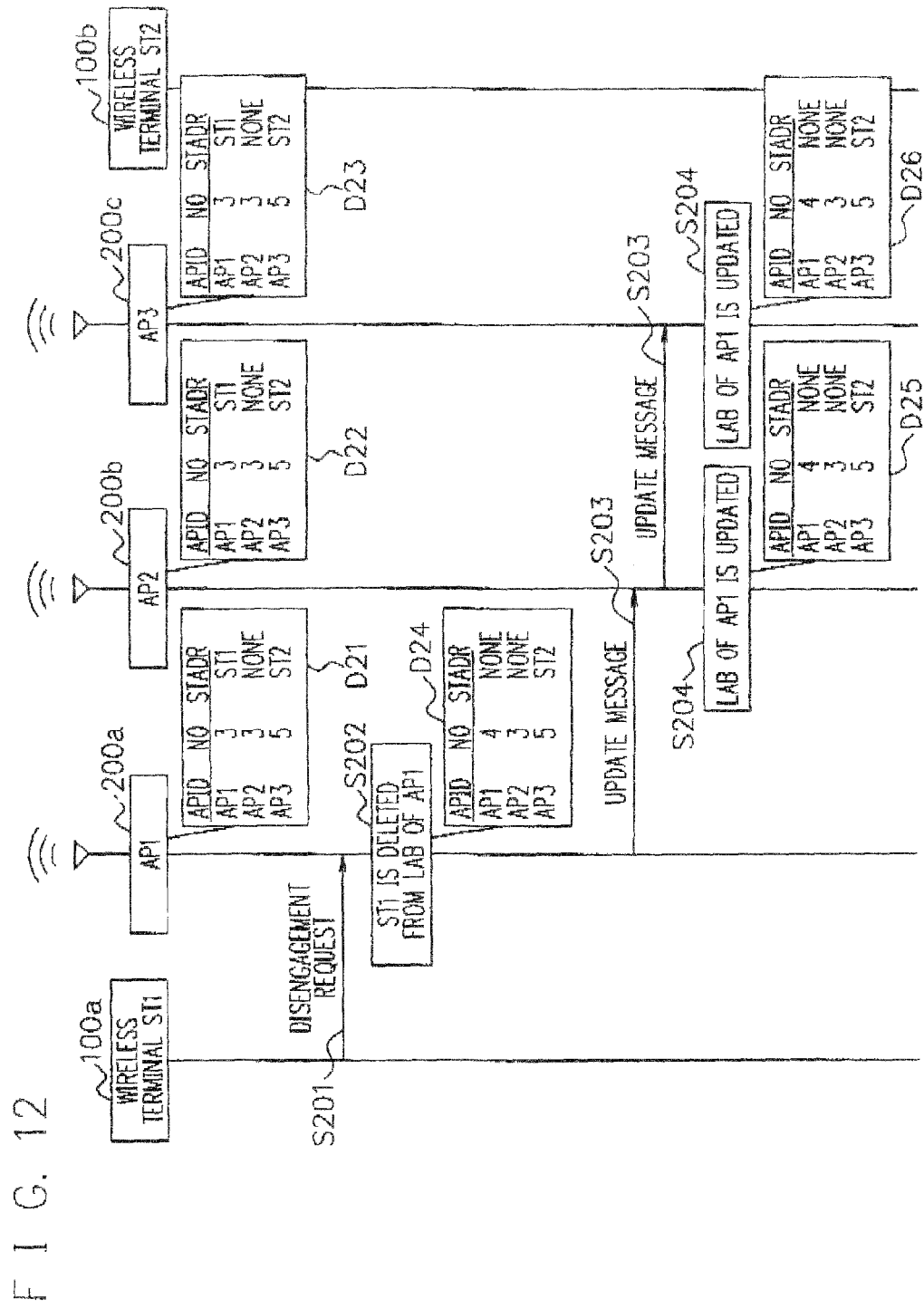
FIG. 12 is a sequence diagram showing example of operation of the wireless meshed network.

A sequence chart shown in FIG. 12 shows methods of notification and update of belonging information when the wireless terminal ST1 (100a) belonging to the AP1 (200a) disengages from the AP1 (200a).

First, wireless terminal ST1 (100a) transmits disengagement request (S300) to AP1 (200a). Upon receiving disengagement request (3201), AP1 (200a) deletes terminal address "ST1" of wireless terminal ST1 (100a) from terminal address column (STADR) of LAB of APID="AP1" that is LAB of own station and updates update number (No) from "3" to "4" (S202, D24).

Next, AP1 (200a) generates UPDATE message from LAB of APID="AP1" that is LAB of the own station and notifies it to all base stations (S203). Upon receiving UPDATE message (S203), AP2 (200b) and AP3 (200e) update LAB of APID="AP1" of GAB (D) based on LAB included in UPDATE message (3203) (S204).

By foregoing operations, in GAB (D) of all base stations, address "ST1" of wireless terminal ST1 (100a) is deleted from LAB of APID="AP1" (D24, D25, D26).

Figure 13:
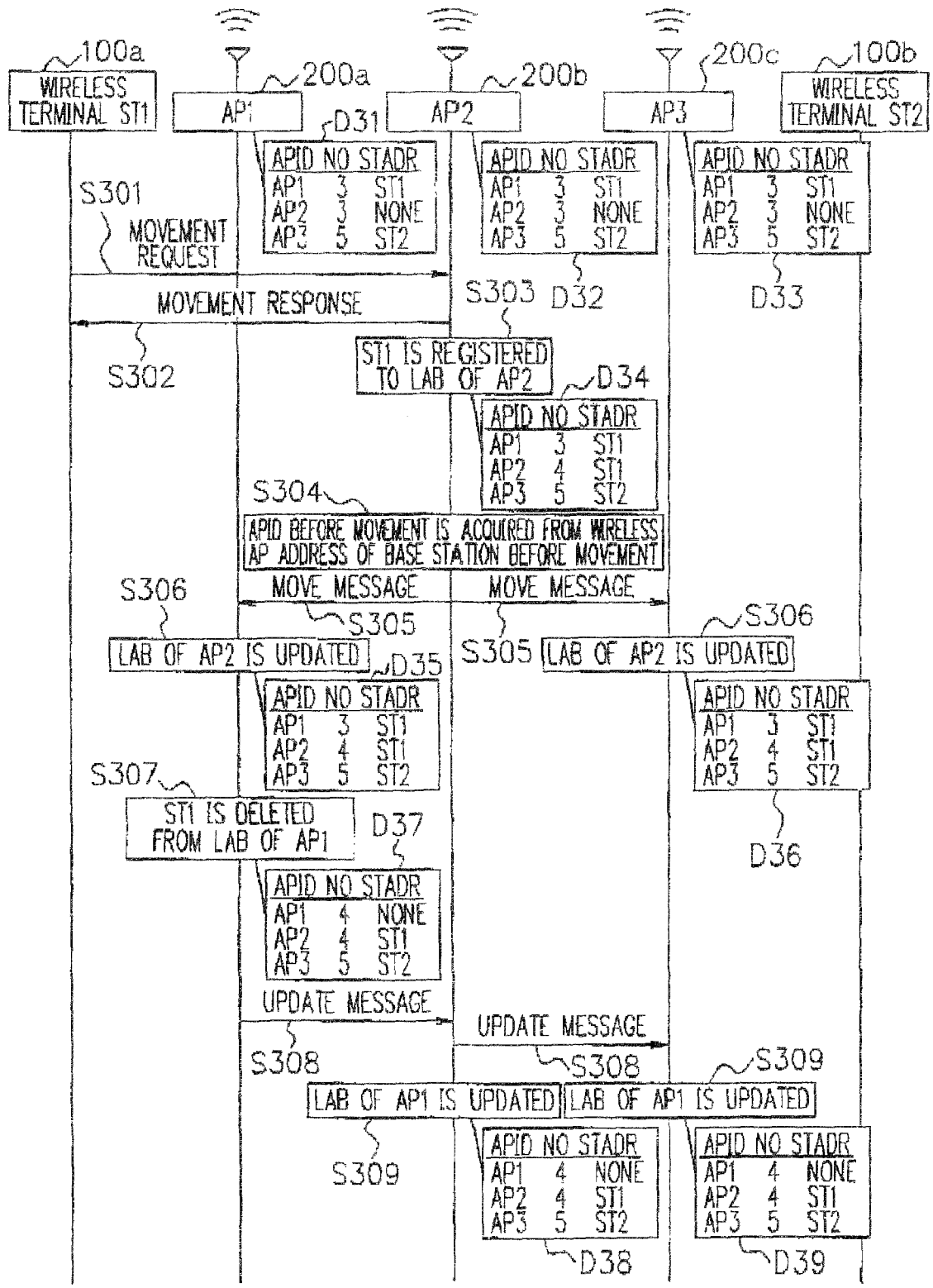
FIG. 13 is a sequence diagram showing example of operation of the wireless meshed network.

A sequence flowchart shown in FIG. 13 shows methods of notification and update of belonging information when wireless terminal ST1 (100a) belonging to AP1 (200a) moves to AP2 (200b).

First, wireless terminal ST1 (100a) transmits movement request (S301) to AP2 (200b). On this occasion, in movement request (S301) is included wireless AP address of the base station to which wireless terminal ST1 (100a) belonged before movement. Upon receiving the movement request (S301), AP2 (200b) transmits movement response (S302) to wireless terminal ST1 (100a).

After transmission, AP2 (200b) registers terminal address "ST1" of wireless terminal ST1 (100a) to terminal address column (STAR) of LAB of PAID="AP2" that is LAB of the own station and updates update number (No) from "3" to "4" (S303, D34). Subsequently, AP2 (200b) obtains APID="AP1" of the base station before movement from wireless AP address of the base station before movement included in movement request (S301) (S304). This processing is realized by that belonging information control unit 244 in FIG. 3 searches for wireless AP address storage unit 242.

Next, AP2 generates MOVE message from LAB of APID="AP2" that is LAB of the own station and notifies it to all other base stations by flooding (S305). To APID (APID 650 before movement in FIG. 7) before movement of the MOVE message (S305) is stored APID="AP1" of the base station before movement obtained in S304, and to movement terminal address (movement terminal address 660 in FIG. 7) is stored terminal address "ST1" of wireless terminal ST1 (100a).

Upon receiving MOVE message (S305), AP2 (200b) and AP3 (200c) update LAB of APID="AP2" of GAB (D) based on LAB included in MOVE message (S305) (S306, D35, D36). Subsequently, upon detecting that before movement APID of MOVE message (S305) is showing the own station, AP1 (200a) deletes movement terminal address "ST1" from LAB of APID="AP1" that is LAB of the own station (2307, D37).

Next, AP1 (200a) generates UPDATE message from LAB of APID="AP1" that is LAB of the own station and notifies it to all other base stations (S308). Upon receiving UPDATE message (S308), AP2 (200b) and AP3 (200c) update LAB of APID="AP1" of GAB (D) based on LAB included in UPDATE message (S308) (S309).

By foregoing operations, in GAB (D) of all base stations, parent station of wireless terminal ST1 (100a) is changed from AP1 (200a) to AP2 (200b) (D37; D38, D39).

Figure 14:
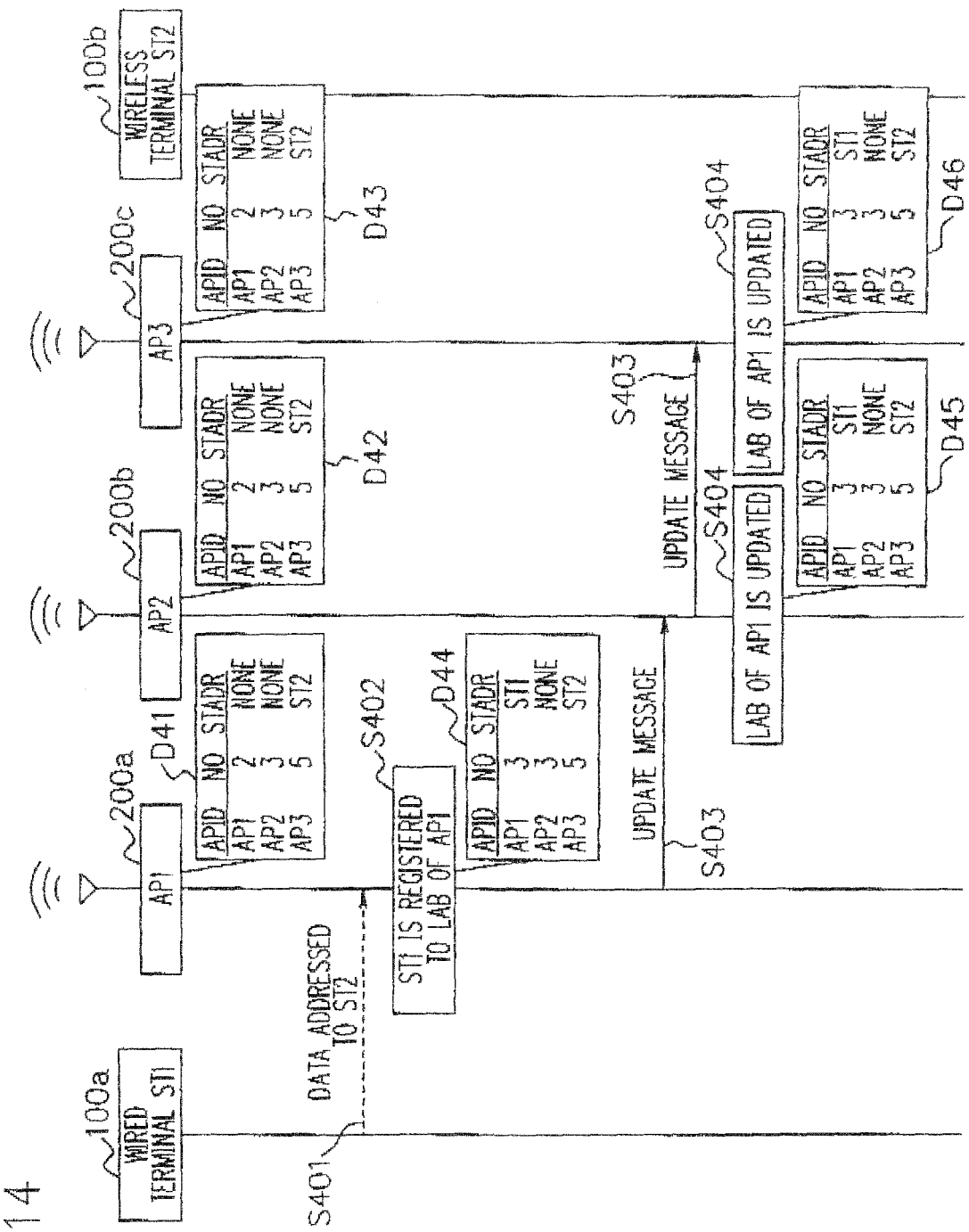
FIG. 14 is a sequence diagram showing example of operation of the wireless meshed network.

A sequence flowchart shown in FIG. 14 shows methods of notification and update of belonging information when wired terminal. ST1 (100a) being connected to base station AP1 (200a) in wired fashion belongs to AP1 (200a). Wired terminal ST1 (100a) transmits a data addressed to wireless terminal ST2 (100b) to base station AP1 (200a) being connected to in wired fashion (S401).

Upon receiving the data addressed to ST2 (S401), AP1 (200a) checks whether or not transmission source address "ST1" of data addressed to ST2 (S401) is present in LAB of APID="AP1" of GAB (D), and if not present, newly registers transmission source address "ST1" (S402, D44). Subsequently, AP1 (200a) generates UPDATE message from LAB of APID="AP1" that is LAB of the own station and notifies it to all other base stations by flooding (S403).

Upon receiving UPDATE message (S403), AP2 (200b) and AP3 (200c) update LAB of APID A "AP1" of GAB (D) based on LAB included in UPDATE message (S403) (S404).

By foregoing operations, in GAB (D) of all base stations, address "ST1" of wireless terminal ST1 (100a) is registered to LAB of APID="AP1" (D44, D45, D46).

In the example of operations shown in FIG. 14, wireless terminal ST2 (100b) may be wired terminal, Destination address of data (S401) which wired terminal ST1 (100a) transmits is not limited to address of particular terminal and may be, for example, multicast address, broadcast address or the like. Further, in the operation, data (S401) to be referred to for belonging of wired terminal ST1 (100a) may be limited to a particular protocol data such as ARP request and ARP response.

Figure 15:
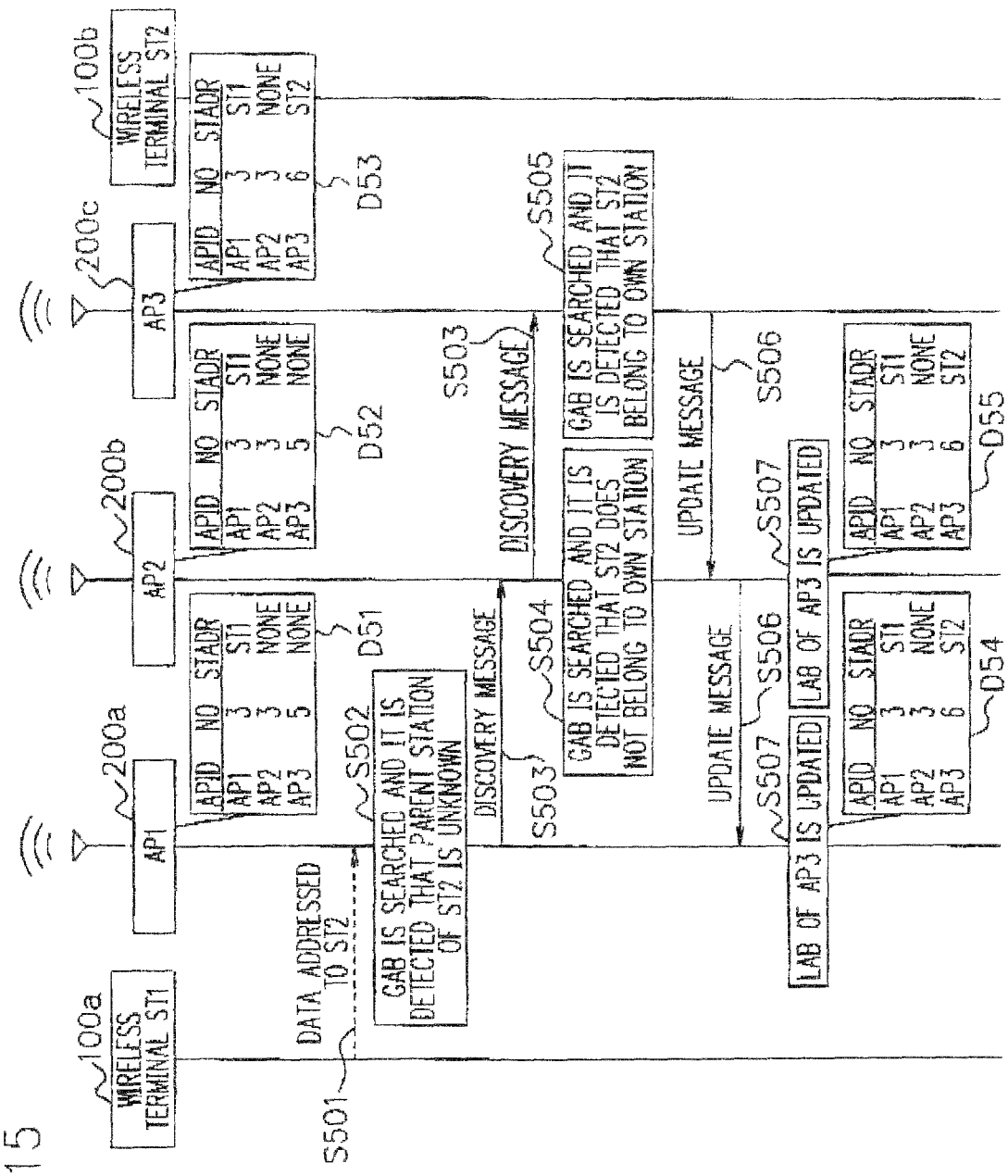
FIG. 15 is a sequence diagram showing example of operation of the wireless meshed network.

A sequence chart shown in FIG. 15 shows a method of searching when parent station of wireless terminal ST2 (100b) is unknown. First, wireless terminal ST1 (100a) transmits a data addressed to wireless terminal ST2 (100b) to AP1 (200a) (S501).

Next, although AP1 (200a) searches for GAB (D51) to transfer data addressed to ST2 (S501), since address "ST2" is not present in any of LAB in GAB, it makes judgment to be parent station unknown, and transmits DISCOVERY message (S502) to all other base stations by flooding. On this occasion, to terminal address column (terminal address 950 in FIG. 10) of DISCOVERY message (8502) is stored searching object address "ST2".

Upon receiving DISCOVERY message (S503), AP2 (200b) searches for GAB for terminal address "ST2" being designated by DISCOVERY message (S503) and if detected that it does not belong to the own station, terminates the processing (S504). Upon receiving DISCOVERY message (S503), AP3 (200c) searches for GAB (D) for terminal address "ST2" designated by DISCOVERY message (S503) and detects that it belongs to the own station (S505).

Next, AP3 (200c) generates UPDATE message from LAB of APID="AP3" that is LAB of the own station and notifies it to all other base stations by flooding (S506). Upon receiving UPDATE message (S506), AP1 (200a) and AP2 (200b) update LAR of APID="AP3" of GAB (D) based on LAB included in UPDATE message (S506) (S507).

By foregoing operations, address "ST2" of wireless terminal ST2 (100b) is registered to LAB of APID="AP3" in all base stations (D54, D55).

Meanwhile, the same operations are performed even if wireless terminal ST1 (100a) and wireless terminal ST2 (100b) are of wired terminals.

Figure 16:
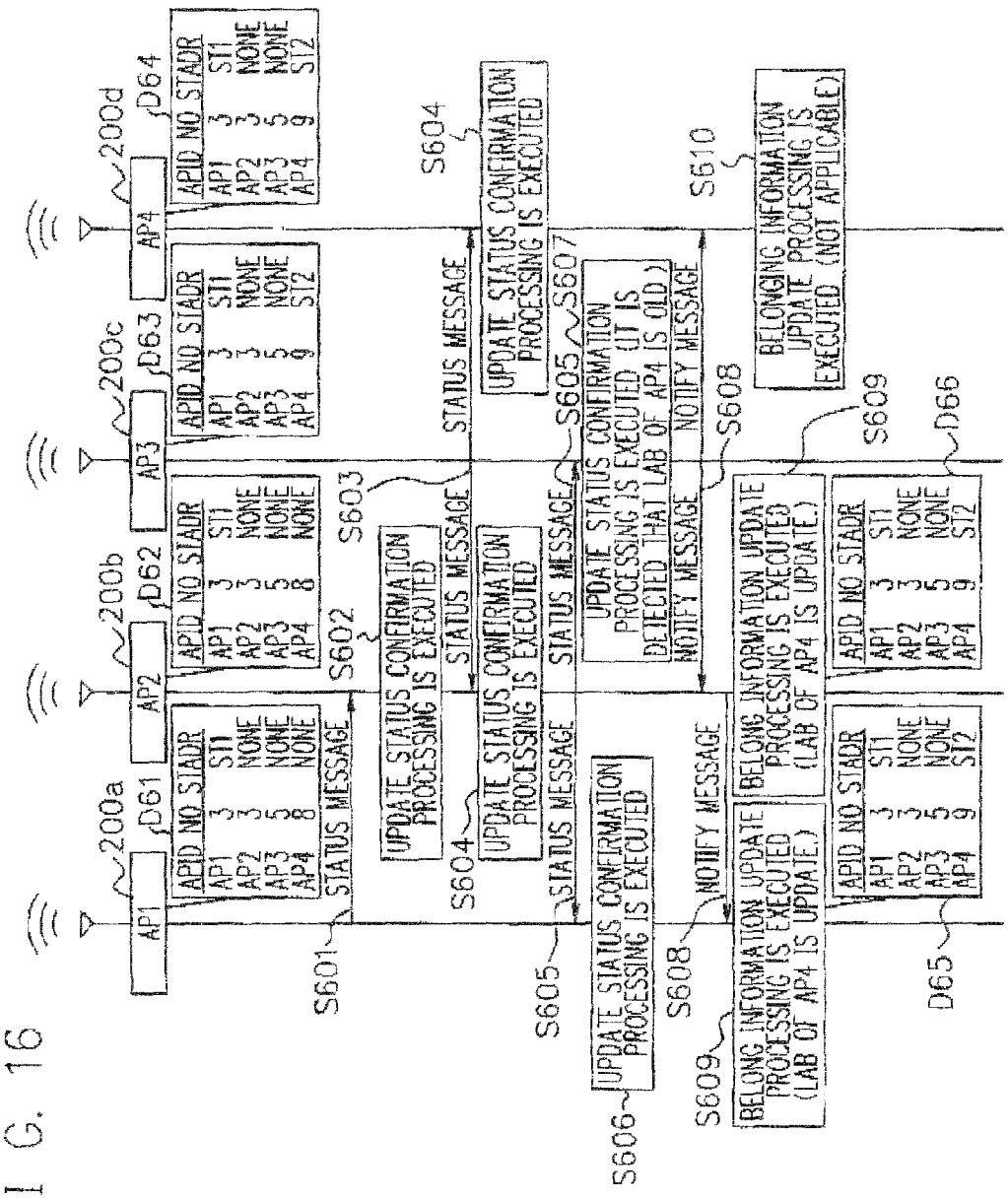
FIG. 16 is a sequence diagram showing example of operation of the wireless meshed network.

A sequence chart shown in FIG. 16 shows a method of synchronization of belonging information between AP1 (200a), AP2 (200b), AP3 (200c) and AP4 (200d). When reference is made to D61, D62, D63 and D64 which are GAB stored by each base station shown in FIG. 16, "ST2" is not present in LAB of APID="AP3" of D61 and D62, while "ST2" is present in D63 and D64, and this is a state where GAB is not synchronized.

First, each base station transmits periodically STATUS message to adjoining base stations, and receiver side executes update status confirmation processing thereby confirming update status each other (S601 to S606). AP3 (200c) receives STATUS message (S605) transmitted by AP2 (200b) and executes update status confirmation processing, and as a result, it is detected that LAB of APID="AP4" stored in AP2 (200b) is old (S607).

Next, AP3 (200c) generates NOTIFY message from GAB (D) which is stored in the own station and notifies it to all other base stations by flooding (S608). Upon receiving NOTIFY message (S608), AP1 (200a) and AP2 (200b) execute belonging information update processing of NOTIFY message and update old LAB stored in GAB (D) of the own station. In this example, LAB of APID="AP4" is updated in AP1 (200a) and AP2 (200b) (S609, 65, D65, D66). AP4 (200d) receives NOTIFY message (S608) and executes belonging information update processing of NOTIFY message similarly, while in this example, there is no need for data update (S610).

By foregoing operations, GAB (D) of all base stations are synchronized all together (D65, D66, D63, D64).

Next, referring to FIG. 4, FIG. 9 and FIG. 17, operations of update status confirmation processing (S602, S604, S606, S607 in FIG. 16) when STATUS message is received will be explained. A flowchart shown in FIG. 17 shows operations of update status confirmation processing when STATUS message is received.

Figure 17:
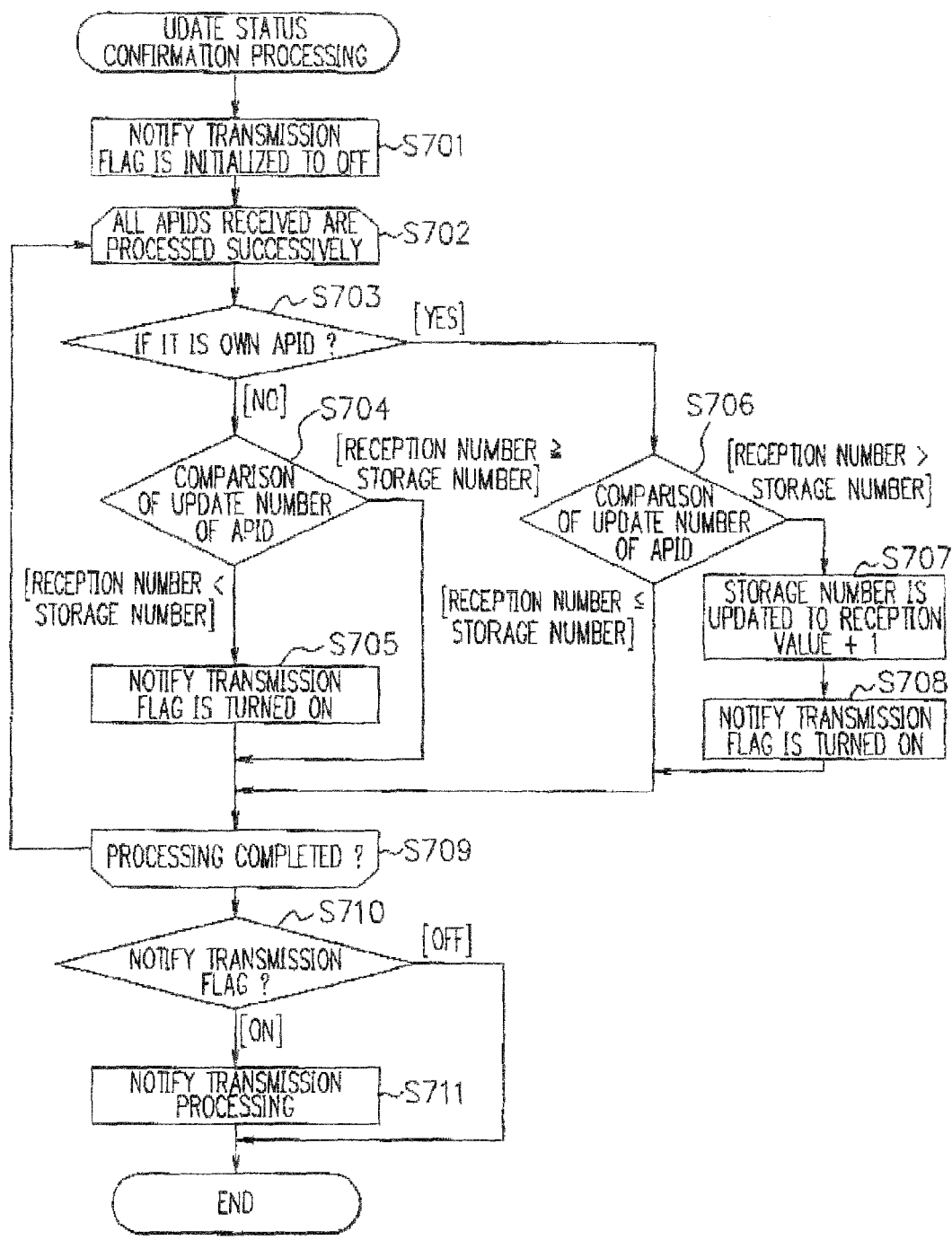
FIG. 17 is a flowchart showing example of operation of the wireless meshed network.

Referring to FIG. 17, upon receiving STATUS message, the base station first initializes "NOTIFY transmission flag" to "OFF" (S701). Subsequently, referring to a first APID (APID 860 in FIG. 9) included in STATUS message, judgment is made if it is APID of the own station (S703).

When it is not APID of the own station, the base station 200 which has received the message comparison compares update number in STATUS message (update number 870 in FIG. 9) and update number of LAB of corresponding APID in GAB (D) stored in the own station (update number 248 in FIG. 4) (S704). When update number received by STATUS message is smaller than the update number stored in GAB (D), NOTIFY transmission flag is turned "ON" (S705).

Meanwhile, when target APID is own station in step S703, the base station 200 which has received the message compares update number received and update number to be stored (S706). When the update number received is larger than the update number stored, update number of LAB of the own station to be stored in GAB (D) in the own station is updated to a new number (received number plus "1") (S707) and NOTIFY transmission flag is turned "ON" (S708). This is a framework to guarantee that the information of LAB holder is the latest one.

As mentioned above, the base station which has received the message repeats from step S702 to S709 as much as all APIDs received by STATUS message, and confirms NOTIFY transmission flag (S710), and if "ON", the base station executes NOTIFY transmission processing (S711).

Next, referring to FIG. 4, FIG. 8 and FIG. 18, operations of belonging information update processing when NOTIFY message is received (S609 and S610 in FIG. 16) will be explained. A flowchart shown in FIG. 18 shows operations of belonging information update processing when NOTIFY message is received.

Figure 18:
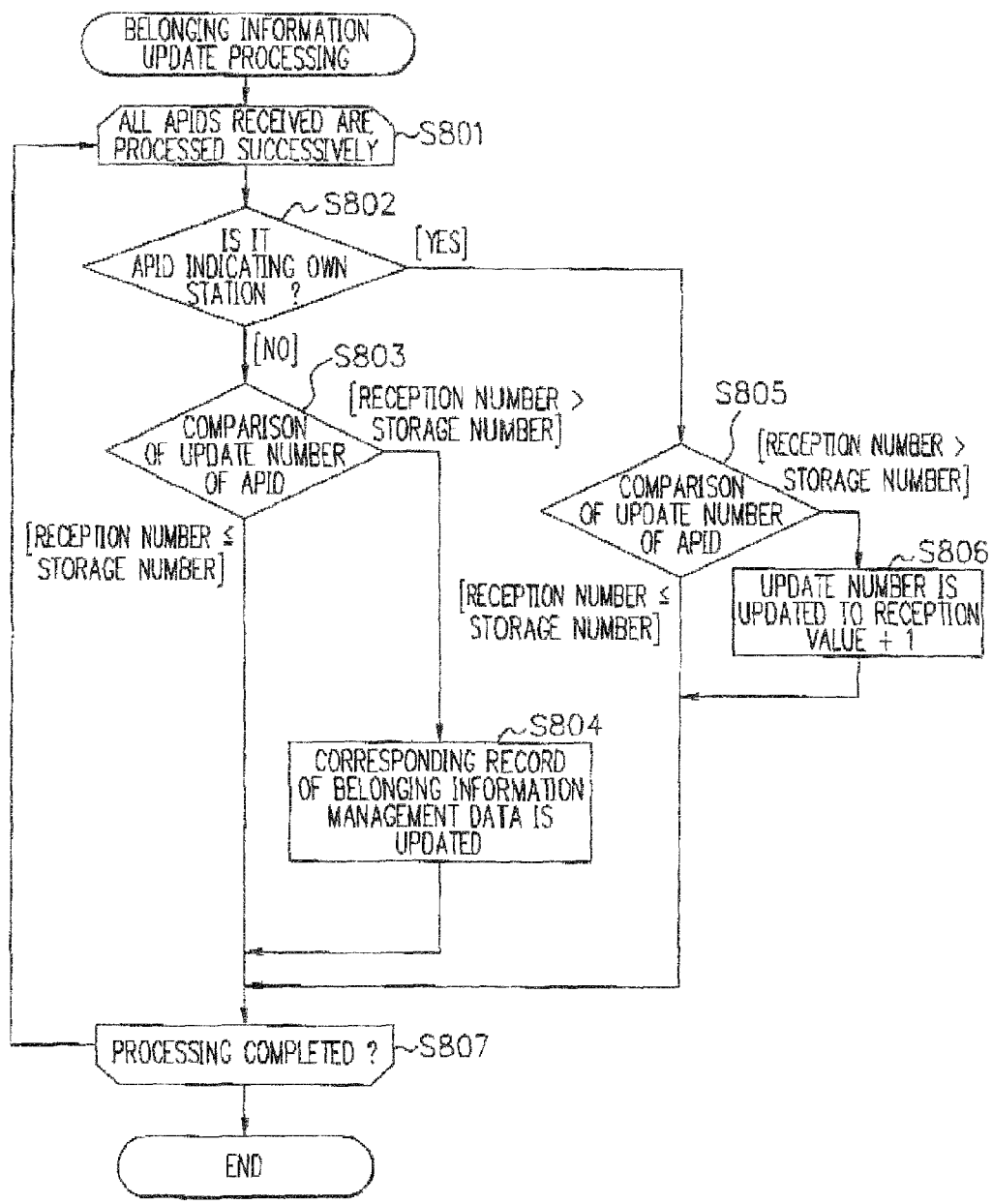
FIG. 18 is a flowchart showing example of operation of the wireless meshed network.

Referring to FIG. 18, upon receiving NOTIFY message, the base station refers to a first APID (APID 760 in FIG. 8) of GAB included in NOTIFY message and makes judgment if it its APID of the own station (S802). If not APID of the own station, comparison is made between update number in NOTIFY message (update number 770 in FIG. 8) and update number (update number 248 in FIG. 4) of corresponding LAB in GAB (D) stored in the own station (S803).

When the update number received by NOTIFY message is larger than the number stored in GAB (D), the base station which has received the message rewrites update number of corresponding LAB in GAB (D) (update number 248 in FIG. 4) and terminal address (terminal address 249 in FIG. 4) by values of update number (update number 770 in FIG. 8) received by NOTIFY message and terminal address (terminal address group 790 in FIG. 8) (S804).

Meanwhile, when target APID is own station in step S802, the base station which has received the message compares received update number and update number to be stored (S805) and if the received update number is larger, the base station updates update number of LAB of the own station to be stored in GAB (D) to a new number (received number plus "1") (S806). This is a framework to guarantee that the information of LAB holder is the latest one.

As mentioned above, the base station which has received the message repeats from step S801 to S807 as much as all APIDs received by NOTIFY message to complete the processing.

Subsequently, referring to FIG. 19, operations for avoiding duplicated transmission of NOTIFY message will be explained. This is a framework to prevent that a plurality of NOTIFY messages are transmitted simultaneously from a plurality of base stations, by receiving STATUS message by a plurality of base stations.

Figure 19:
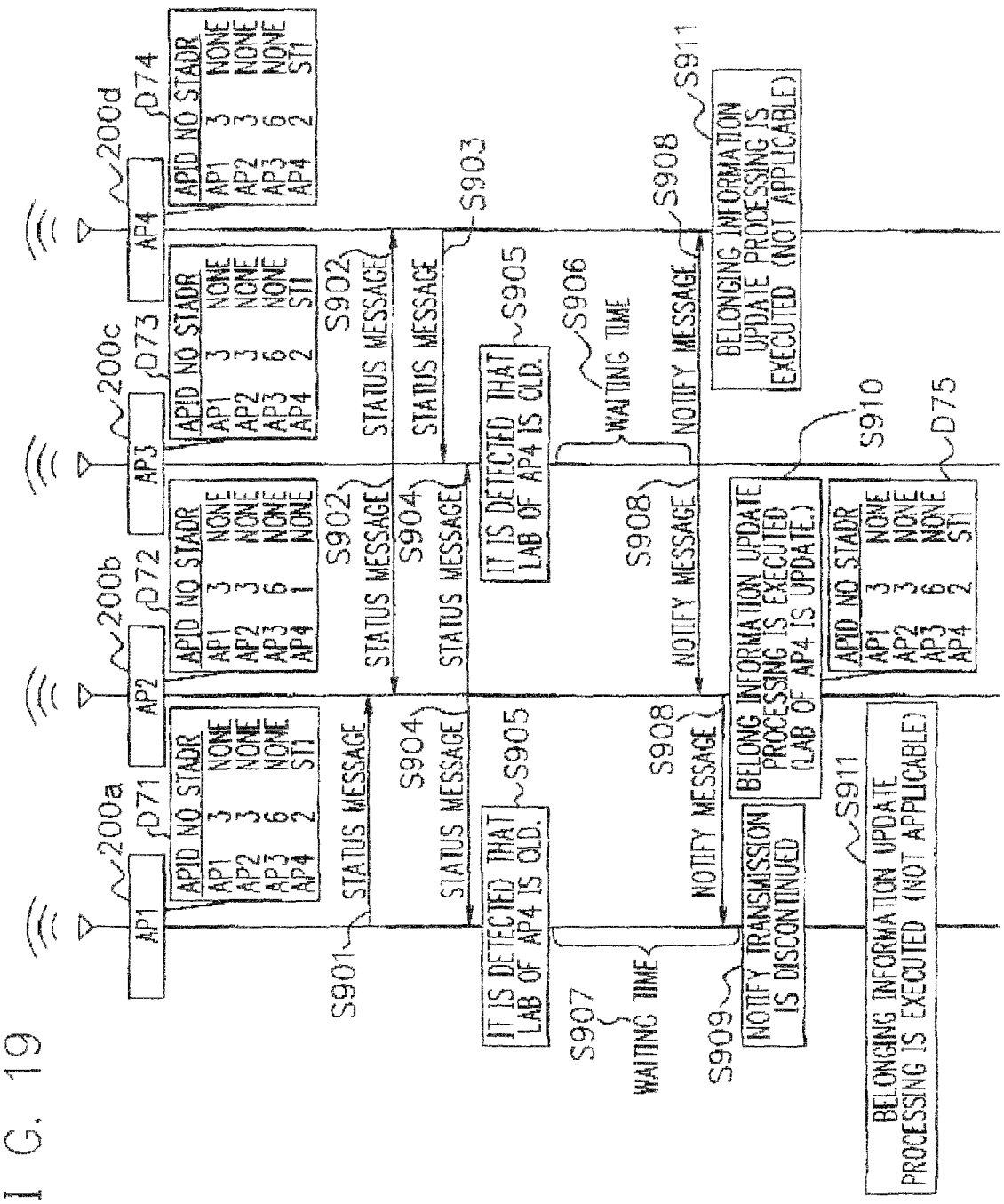
FIG. 19 is a sequence diagram showing example of operation of the wireless meshed network.

A sequence chart shown in FIG. 19 shows operations when AP1 (200a) and AP3 (200c) detected that GAB of AP2 (200b) is old. When AP2 (200b) transmits STATUS message in S904, both AP1 (200a) and AP3 (200c) detect that GAB of AP2 (200b) is old (S905).

Here, AP1 (200a) and AP3 (200c) do not transmit NOTIFY message immediately, but wait temporarily for each different waiting time, and perform transmission of NOTIFY message after the waiting time elapsed (S908). The waiting time may be such one calculated by the belonging information control unit 244 of each base station using various predetermined methods, for example, values each different for every AP are determined in advance, value each different for every AP such as AP address, APID are used, or random number table is used.

In the example shown in FIG. 19, transmission of NOTIFY message is discontinued by that NOTIFY message is received from AP3 (200c) during the waiting time (S909). With this feature, duplicated transmission of NOTIFY message from both AP1 (200a) and AP3 (200c) is avoided.

Figure 20:
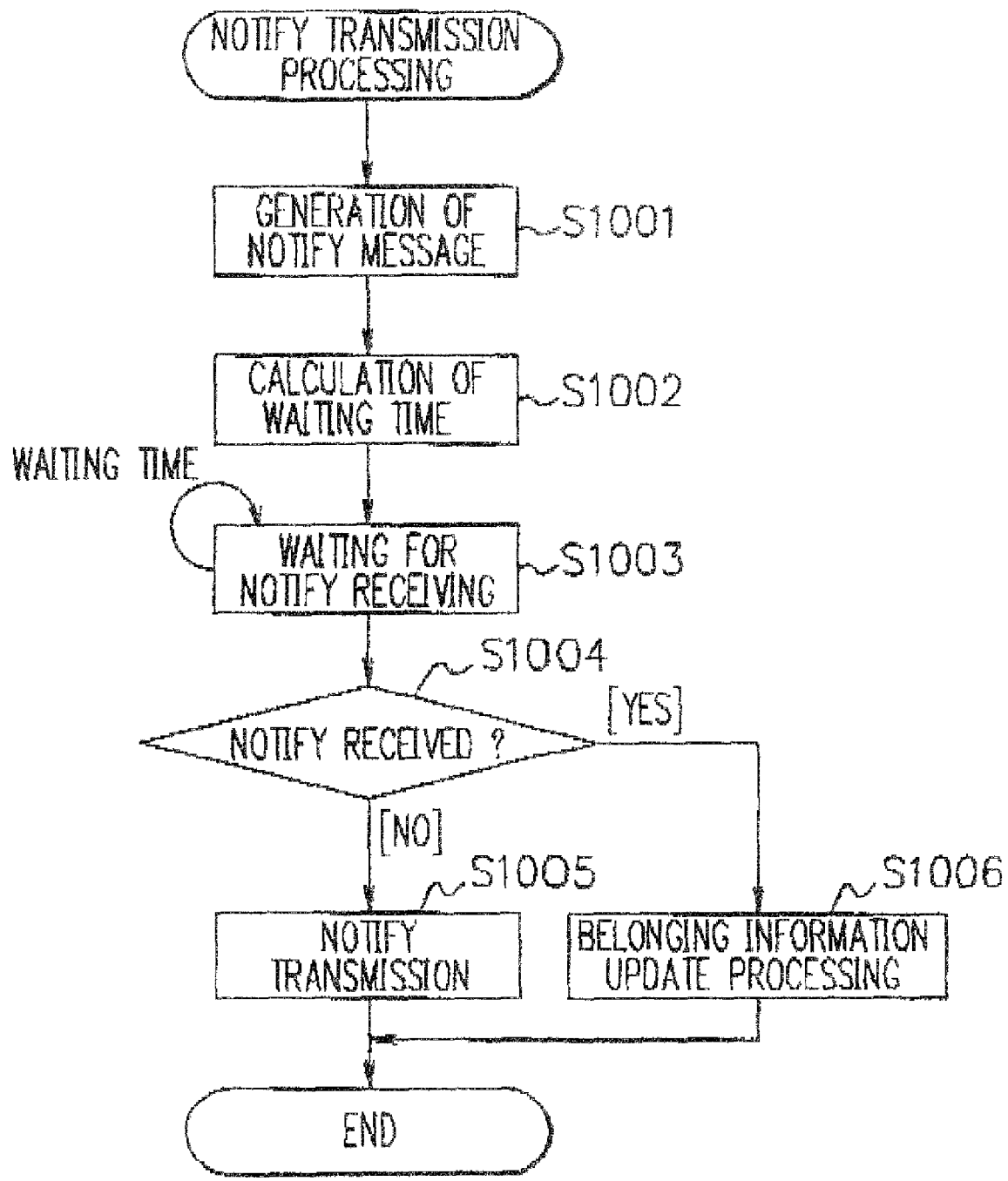
FIG. 20 is a flowchart showing example of operation of the wireless meshed network.

A flowchart shown in FIG. 20 shows operations of a base station for avoidance of duplicated transmission of NOTIFY message and corresponds to S905 to S909 shown in FIG. 19. Referring to FIG. 20, prior to transmission of NOTIFY message, the base station first generates NOTIFY message (S1001).

Next, the base station calculates waiting time at random using random numbers being stored in advance (S102). Subsequently, the base station waits for NOTIFY message from other base stations using the waiting time obtained in step S1002 as the maximum waiting time (S1003). When NOTIFY message is received from other base station or the waiting time elapsed, it proceeds to the next step to make judgment whether or not NOTIFY message is received (S1004).

When NOTIFY message is not received, namely, the waiting time elapsed, the base station which generates NOTIFY message in step S1001 transmits the NOTIFY message generated (S1005). When NOTIFY message has been received from other base station, the base station which generates NOTIFY message in step S1001 performs belonging information update processing of NOTIFY message based on the NOTIFY message received (S1006) thereby completing the processing.

By foregoing operations, simultaneous transmission of NOTIFY message from a plurality of base stations is avoided.

Meanwhile, the processing shown in FIG. 20 is performed routinely at NOTIFY message transmission, and waiting for a waiting time is provided similarly for transmission of NOTIFY message (S608) in FIG. 16. For simplicity reason, descriptions are omitted in FIG. 16.

Figure 21:
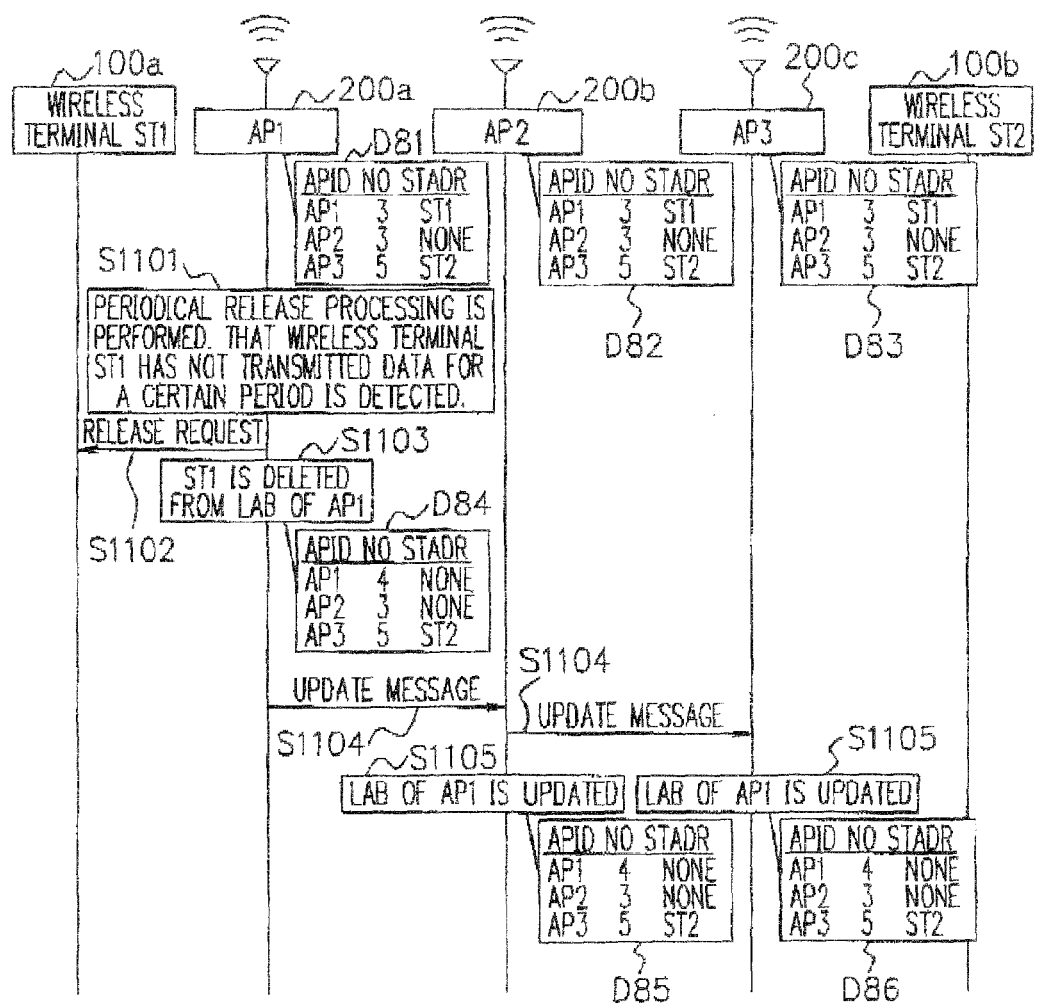
FIG. 21 is a sequence diagram showing example of operation of the wireless meshed network.

A sequence chart in FIG. 21 shows a method for releasing the belonging of wireless terminal ST1 (100a) for cases where wireless terminal ST1 (100a) belonging to AP1 (200a) is not disengaged and is outside radio wave range, or communication does not take place for a certain period.

First, by detecting that wireless terminal ST1 (100a) belonging to the own station has not transmitted a data for a predetermined certain period (S1101), AP1 (200a) transmits disengagement request (S1102) to wireless terminal ST1 (100a). Subsequently, AP1 (200a) deletes terminal address "ST1" from LAB of APID="AP1" of GAB (D) (S1103, D84). Subsequently, AP1 (200a) generates UPDATE message based on LAB of APID="AP1" and notifies it to all base stations (S1104).

Upon receiving UPDATE message (S1104), AP2 (200b) and AP3 (200c) update LAB of APID "AP1" of GAB (D) based on LAB included in UPDATE message (S1104) (S1105, D85, D86).

By foregoing operations, terminal address "ST1" of wireless terminal ST1 (100a) is deleted from LAB of APID="AP1" in GAB (D) of all base stations (D84, D85, D86).

Meanwhile, in the operation shown in FIG. 21, when wireless terminal ST1 (100a) is a wired terminal, this operation is used as automatic disengagement processing of the wired terminal. In the case of the wired terminal, disengagement request (S1102) will be omitted without being transmitted.

Figure 22:
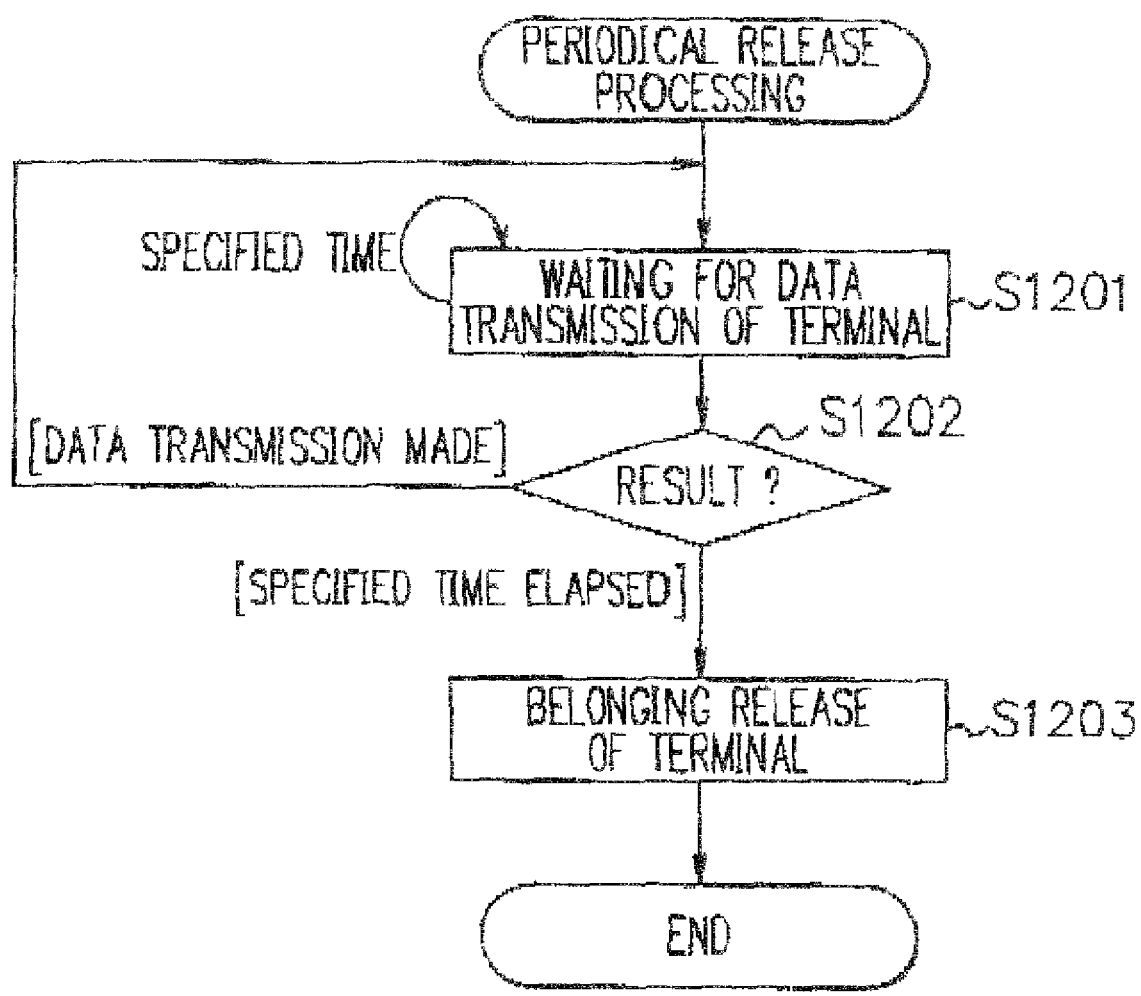
FIG. 22 is a flowchart showing example of operation of the wireless meshed network.

Next, using a flowchart shown in FIG. 22, operations of frequency releasing processing (S1101) shown in FIG. 21 will be explained.

Frequency releasing processing is started at a stage when a terminal belonged to a base station. When frequency releasing processing is started, belonging information control unit 244 first performs elapsed time measurement and waits for data transmission from a terminal till a predetermined time (S1201). In step S1201, when data transmission is made from the terminal, it waits again for data transmission, and returns to step S1201 (S1202). Meanwhile, in step S1201, when no data transmission is made from the terminal within a specified time, belonging releasing of the terminal is performed (S1203).

Figure 23:
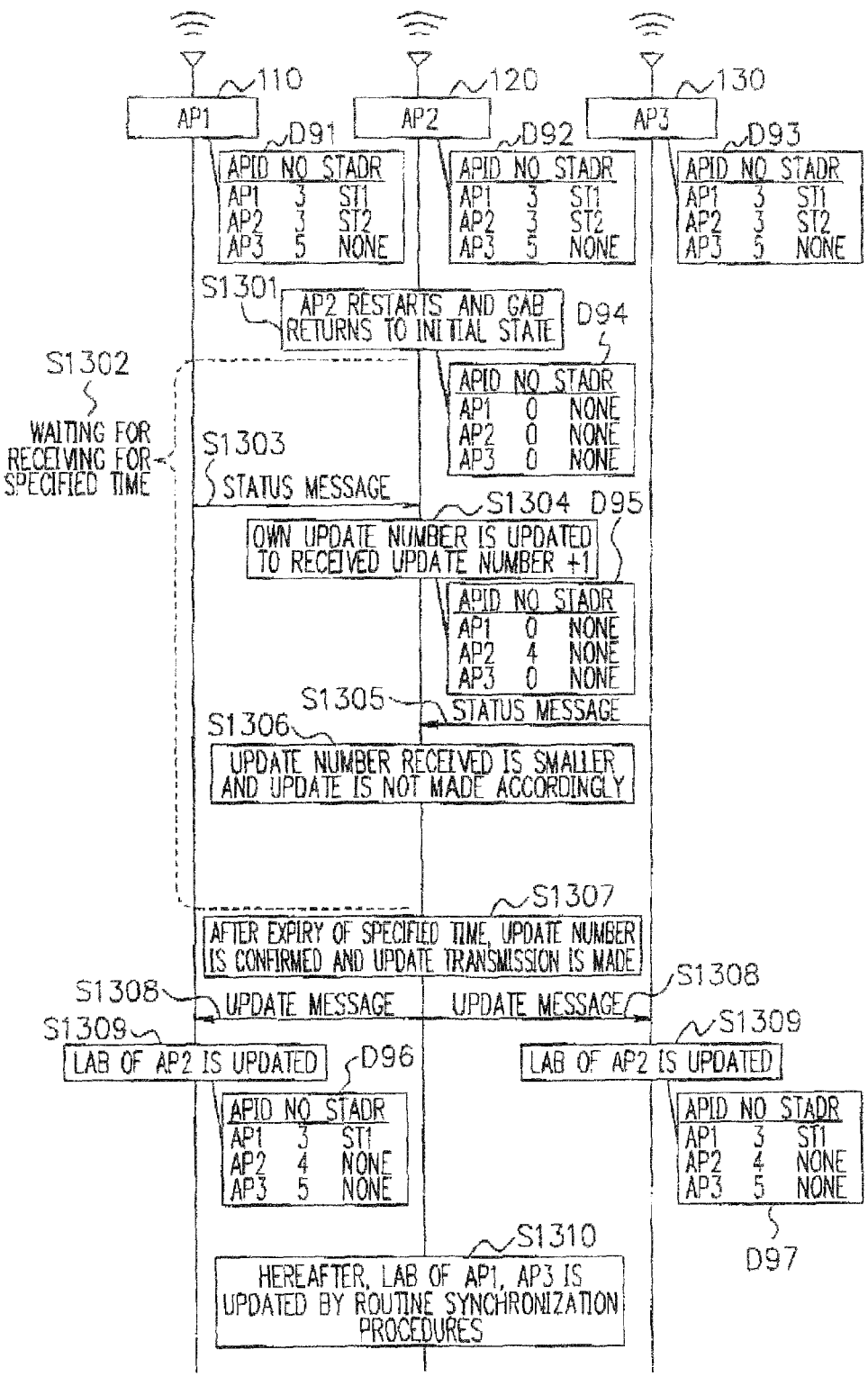
FIG. 23 is a sequence diagram showing example of operation of the wireless meshed network.

Next, referring to a sequence chart shown in FIG. 23, initial setting operation at starting and re-starting of the base station is explained.

This operation is intended for a case where update number is stored in a volatile memory and the update number is reset to zero (0) at the next starting due to power-off, and is not required for a case where update number is stored in non-volatile storage such as non-volatile memory.

In the example of operation shown in FIG. 23, it is assumed that AP2 is restarted after power-off (S1301). With AP2 immediately after starting, all update numbers of GAB (D) are set to zero (0) (D94). After started, AP2 waits for reception of STATUS or NOTIFY for a specified predetermined time (1302).

When update number included in STATUS or NOTIFY (S1303) received from other AP during waiting time is equal to or more than each update number of GAB controlled by the own station, the started AP updates the update number to reception value+1 (S1304, D59).

When update number included in STATUS or NOTIFY (S1305) received is smaller than each update number of GAB controlled by the own station, the started AP does not update the number but ignores (S1306).

After the specified time measured by the belonging information control unit 244 elapsed (expiry of a timer), AP2 confirms each update number in GAB (D) of the own station and notifies belonging information (LAB) of the own station including the update number to other base stations in the form of UPDATE (S 307).

GAB of other base stations is updated to the latest update number by UPDATE transmission (S1308) (S1309, D96, D97).

For LAB of other AP of GAB stored in the own station, synchronization is made with ordinary synchronizing procedures after the initialization is completed (S1310).

As mentioned above, the following effects are obtained according to the exemplary embodiment.

A first effect is that after a terminal newly belonged to a base station, communication with the terminal is made available instantly.

The reason for this is, when a change is caused to belonging information, a base station conveys immediately the belonging information to all other base stations.

A second effect is that, when the terminal moves between base stations, time for communication discontinuation is short.

The reason for this is that base stations cooperate each other before and after the movement and conveys immediately a change in belonging information due to movement to all other base stations.

A third effect is that, when a wired terminal is connected, communication can be started without special setting.

The reason for this is that belonging information of the wired terminal can be controlled dynamically while it is registered to the belonging information based on transmission source address of the data transmitted by the wired terminal and when transmission of data does not take place for a certain period, the belonging information is then deleted.

In this way, the fact that wired terminal is accommodated dynamically and belonging information thereof can be controlled allows easy accommodation of wired terminal such as a fixed camera or an application server also in the wireless meshed network system thereby expanding applications, which is considered very useful.

A fourth effect is that, even if transmission of belonging information is failed temporarily, it is automatically updated to the latest state.

The reason for this is that, when belonging information is changed, belonging information of all terminals belonging to the base station concerned are conveyed to other base stations together with the information changed.

A fifth effect is that, even if transmission of belonging information is failed temporarily, it is updated promptly to the latest state.

The reason for this is that synchronization of belonging information between base stations is checked periodically and when out-of-synchronization is detected, the latest information is notified immediately and synchronization is regained.

A sixth effect is that, when out-of-synchronization is detected between a plurality of base stations, synchronization is regained by one-time message transmission.

The reason for this is that, when out-of-synchronization is detected with a certain base station, the latest information is notified immediately to all base stations.

A seventh effect is that, in periodical confirmation of belonging information, compression of network band is less.

The reason for this is that, in synchronization confirmation, the amount of data is reduced by exchanging update number only of each base station in lieu of all belonging information, and the amount of messages becomes less since each base station exchanges messages with adjoining station only for synchronization confirmation.

An eighth effect is that loads are not concentrated to a certain particular base station, but load distribution is realized.

The reason for this is that, since all base stations hold the same belonging information and the update number is used, all base stations can make judgment of new/old of the information and that, when belonging information are out-of-synchronization, an arbitrary base station that detected the out-of-synchronization notifies new belonging information.

A ninth effect is that the information is not depending on a certain particular base station and risk distribution is thus realized.

The reason for this is that, since all base stations hold the same belonging information and the update number is used, all base stations can make judgment of new/old of the information and that, when belonging information are out-of-synchronization, an arbitrary base station that detected the out-of-synchronization notifies new belonging information.

A tenth effect is that result of searching of terminals is reflected concurrently to other base stations.

The reason for this is that for searching request, a base station, to which a searching target terminal belongs, notifies the belonging information to all other base stations.

In this way, in the exemplary embodiment, each base station has a framework for judging new/old of each LAB in GAB and newness of the information can be assured for LAB of other base stations. Therefore, it is possible for other base station to notify LAB of all base stations, that is, GAB to other base stations on behalf of LAB holder.

With this feature, flooding for synchronization of GAB of all base stations can be completed at one-time attempt without causing such a difficulty that all base stations perform flooding of LAB with constant frequency and number of messages increases as a whole network, thereby compressing the network band. Therefore, the number of messages can be reduced and loads to the network traffic can be suppressed to a lower level.

Further, since, on behalf of the base station holding LAB, other base station can notify LAB of all base stations, that is, GAB, to all other base stations, there is no need to make inquiries at every terminal and every base station for the sake of synchronization. Therefore, even in a case where messages between base stations are not received on several occasions for a certain period due to communication disconnection, reduction in the efficiency due to frequent occurrence of searching can be avoided.

Further, even in a case where information advertising frame of one station is not conveyed to a plurality of base stations, reduction in the efficiency due to frequent occurrence of searching can be avoided.

In general, wireless meshed network is designed to expand communicable range of wireless communication by that wireless communication terminals transfer packets of other wireless communication terminals in bucket brigade fashion, and therefore, in order to maintain specifically mobility of terminals and continuity of communication, it is important to convey a change in the belonging information to whole network promptly.

Here, there is such a drawback that with wireless meshed network, although flooding making use of multiple addressing of wireless communication is used frequently, since flooding in the wireless meshed network is based on broadcast communication, arrival confirmation is not made normally, and even if loss of information should occur, confirmation of the loss is not possible.

In contrast, according to the exemplary embodiment, even under an environment where there is a possibility to receive update notification information from a plurality of wireless base stations as represented by the wireless meshed network where wireless communication is performed between many base stations, a change in the belonging information can be conveyed promptly and synchronization of belonging information stored in each base station can be maintained reliably.

Further, since belonging information of the terminal, are exchanged between base stations as mentioned above and GAB is being controlled and maintained, it is possible to prevent traffic generation accompanying a large amount of data for synchronization of GAB.

Further, even with data which are not sequential to be accumulated in a buffer in chronological order, which appear or disappear disorderly at each base station as represented by belonging information of GAB, and are not arranged in orderly fashion, synchronization can be attained promptly and reliably between base stations. Therefore, stable wireless communication environments can be provided.

Even a case where update of GAB is not possible for a certain period due to communication disconnection by influences of wireless interference or the like and a plurality of differences are caused with regard to GAB of other base station, it is possible to update GAB promptly to the latest state without waiting for LABA message from a plurality of base stations.

Further, according to the exemplary embodiment, each of the effects can be obtained by functions of the wireless base station, and therefore, there is no need to add functions or to provide limitations to wireless terminals or to wired terminals, and each of the effects can be obtained while ordinary wireless terminals and wired terminals are connected.

Second Exemplary Embodiment

Next, a second exemplary embodiment of the present invention will be explained.

Figure 24:
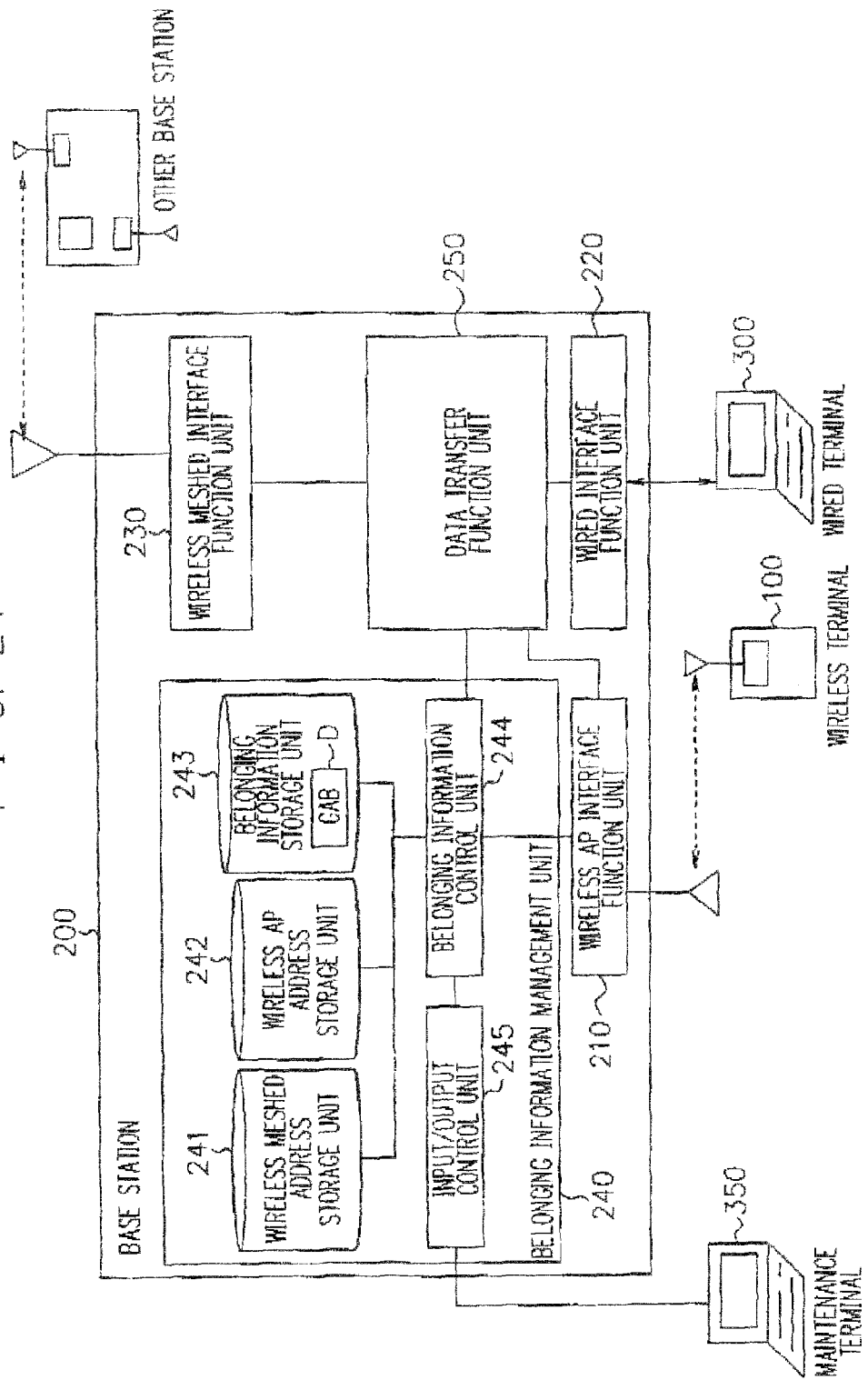
FIG. 24 is a block diagram showing composition example of the second exemplary embodiment of the present invention.

With the second exemplary embodiment, as shown in FIG. 24, an input/output control unit (update request receiving means) 245 is added to the composition shown in FIG. 3 in the exemplary embodiment to allow manual input to LAB by a maintenance terminal (other information processing device).

The input/output control unit 245 indicates belonging registration or belonging release to the belonging information control unit 244 according to an input from the maintenance terminal (350). The maintenance terminal (350) includes a function for remote login to the base station thereof by controls of the input/output control unit 245.

The belonging information control unit 244 rewrites LAB of the own station in GAB (D) being stored in the belonging information storage unit 243 according to instructions such as belonging registration and belonging release from the maintenance terminal (350) to which login is made, and conveys the belonging information exchange message to other base stations. With these features, it is possible to update LAB by manual operation.

Operations of the second exemplary embodiment will be explained using sequence charts shown in FIG. 25 and FIG. 26.

Figure 25:
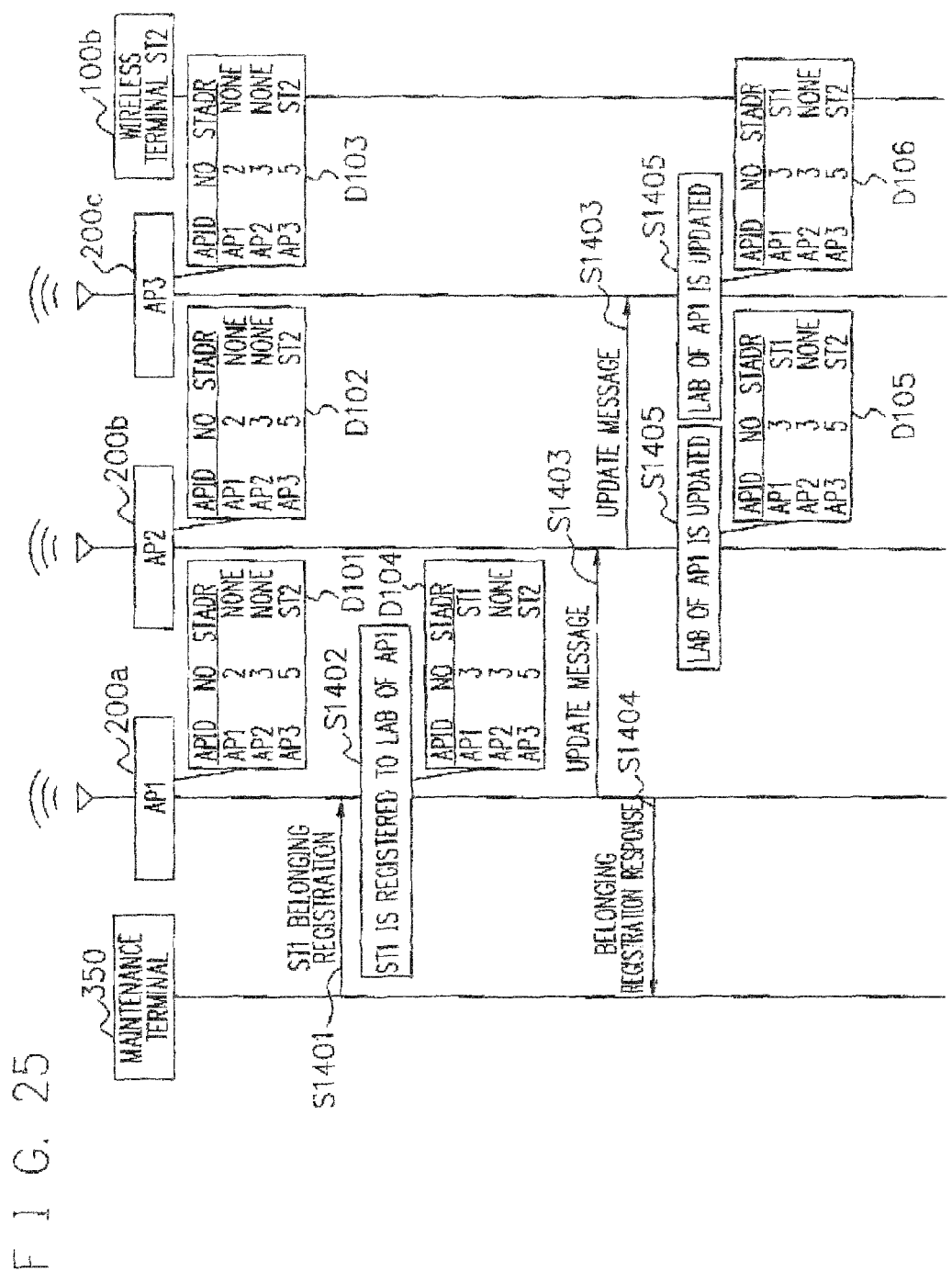
FIG. 25 is a sequence diagram showing example of operation of wireless meshed network as the second exemplary embodiment.

The sequence chart shown in FIG. 25 shows a method that the maintenance terminal (350) connected to AP1 (200*a*) instructs AP1 (200*a*) to cause terminal ST1 to belong.

First, ST1 belonging registration (S1401) is instructed from the maintenance terminal (350) to AP1 (200*a*). Subsequently, AP1 (200*a*) registers terminal address "ST1" of wireless terminal ST1 (100*a*) to LAB of APID="AP1" that is own station LAB of GAB (D) and then updates the update number (No) from "2" to "3" (S1402). As a result, GAB of AP1 (200*a*) becomes 1104.

Next, AP1 (200*a*) generates UPDATE message based on LAB of APID="AP1" of GAB (D), notifies it to all other base stations by flooding (S1403), and notifies belonging registration response (S1404) to the maintenance terminal (350). Upon receiving UPDATE message (81403), AP2 (200*b*) and AP3 (200*c*) update LAB of APID "AP1" of GAB (D) based on LAB included in UPDATE message (S1403) (S1405).

By foregoing operations, in GAB (D) of all base stations, terminal address "ST1" of wireless terminal ST1 (100*a*) is registered to LAB of APID="APP" (D104, D105, D106).

Figure 26:
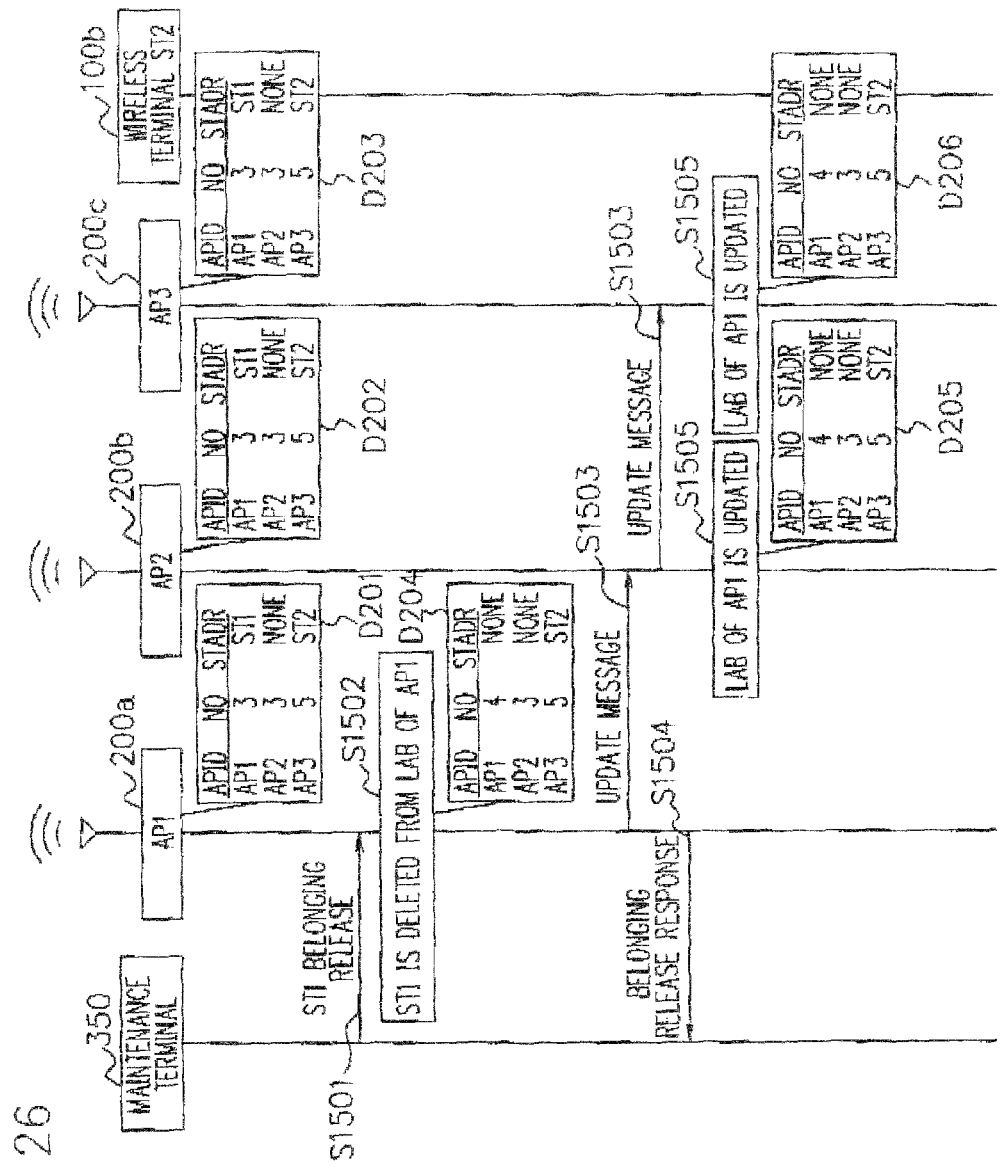
FIG. 26 is a sequence diagram showing example of operation of the wireless meshed network.

The sequence chart shown in FIG. 26 shows a method that the maintenance terminal (350) connected to AP1 (200*a*) instructs AP1 (200*a*) to cause terminal ST1 (100*a*) currently belonging to AP1 (200*a*) to be disengaged.

First, ST1 release request (S1501) is instructed from the maintenance terminal (350) to AP1 (200*a*). Subsequently, AP1 (200*a*) deletes terminal address "ST1" of wireless terminal ST1 (100*a*) from LAB of APID="AP1" and then updates the update number (No) from "3" to "4" (S1502, D204).

Next, AP1 (200*a*) generates UPDATE message based on LAB of APID="AP1" of GAB (D), notifies it to all base stations (S1503), and notifies release response (S1504) to the maintenance terminal (350). Upon receiving UPDATE message (S1503), AP2 (200*b*) and AP3 (200*e*) update LAB of APID="AP1" of GAB (D) based on LAB included in UPDATE message (S1503) (S1505).

By foregoing operations, in GAB (D) of all base stations, address "ST1" of wireless terminal ST1 (100*a*) is deleted from LAB of APID="AP1" (D204, D205, D206).

As mentioned above, according to the second exemplary embodiment, the same effects as attained by the first exemplary embodiment are obtained and at the same time, manual input to LAB by the maintenance terminal (350) is possible, and accordingly, even if an unforeseen difficulty should occur during operation, appropriate maintenance management suited for network circumstances can be provided.

Each Exemplary Embodiment

Each of the exemplary embodiments is preferable embodiment of the present invention, and the present invention is not limited thereto and can be modified in various ways based on the technical concept of the present invention.

For example, the number of wireless base stations (AP), wired terminals and wireless terminals is not limited to those mentioned above, and any number may be used as long as being connected in communicable fashion.

Further, each of messages shown in FIG. 6 through FIG. 10 is one example in the exemplary embodiment, and elements constituting the message and their order are not limited to those shown in the drawings, and various types of data structures may be used.

Further, in each of the exemplary embodiments, although explanation is given based on that the update number is added sequentially, this is not construed to be a limitation, and any alternative may be used as long as newness of the update can be confirmed.

Further, various types of message transmissions between base stations in the exemplary embodiment are not limited to transmission by wireless communication, and those by wired communication may be used.

In other words, as exemplified in FIG. 27, the present invention can be realized similarly by such a composition that various types of messages are transmitted from base station AP1 of wireless meshed network M1 to base station AP4 of other wireless meshed network M2 being connected in wired fashion, GAB is synchronized in each of wireless meshed network as mentioned above, and GAB is eventually synchronized between a plurality of wireless meshed network.

Further, processing procedures for realization of wireless meshed network system and wireless base station as each exemplary embodiment mentioned above are recorded in a recording medium, and each of the functions according to each exemplary embodiment of the present invention is realized by causing CPU of a computer constituting the system to execute the program supplied from the recording medium.

In this case, the present invention is applicable to such a case where information group including the program is supplied to an output device from the recording medium or from external recording medium via network.

That is, program code itself read from the recording medium realizes a novel function of the present invention, and recording medium in which the program code is stored and signal read from the recording medium will constitute the present invention.

As for the recording medium, for example, flexible disc, hard disc, optical disc, magnetic optical disc, CD-ROM, CD-R, CD-RW, DVD-ROM, DVD-RAM, DVD-RW, DVD+RW, magnetic tape, non-volatile memory card, ROM and the like may be used.

According to the storage medium for storing the program relating to the present invention, it is possible to cause wireless meshed network system and wireless base station being controlled by the program to realize each of functions in the above-mentioned each exemplary embodiment.

As mentioned above, according to the present invention, the belonging information management table can be synchronized promptly and reliably even in an environment where there is a possibility that update notification information is received from a plurality of wireless base stations, thereby providing stable wireless communication environment.

In addition, even when a plurality of unsynchronized differences are caused, unnecessarily large traffic generation for synchronization of the belonging information management table is not needed and the above effects can be obtained.

What is claimed is:

1. A wireless base station of a wireless meshed network in which a plurality of terminals arbitrarily move between wireless base stations, said wireless base station comprising:

a terminal interface function unit which communicates with the plurality of terminals belonging to a corresponding one wireless base station in the wireless meshed network comprised of said one wireless base station and a number of other wireless base stations, the plural terminals arbitrarily moving between the wireless base stations;

a wireless base station interface function unit which communicates with the other wireless base stations composing the wireless meshed network;

a management table storage unit which stores a belonging information management table which includes belonging information of a terminal in each of the wireless base stations with an update number, which update number is incremented by one (1) whenever the terminal is added or deleted in the belonging information, for judgment of new or old of an update state of the belonging information; and a belonging information update unit which updates the belonging information of said one wireless base station when a change in a belonging status of the terminal due to addition or deletion has been detected by corresponding information received through the terminal interface function unit;

a first notification information transmission unit which transmits, when the belonging information is updated, first notification information including an updated portion in the belonging information together with the incremented update number to all other wireless base stations through the wireless base station interface function unit, wherein the belonging information update unit updates, when the first notification information is received from other wireless base station, the belonging information management table stored in said one base station based on the first notification information;

a periodical information transmission unit which transmits periodical transmission information including the number of wireless base stations included in the belonging information management table of said one wireless base station together with respective incremented update numbers corresponding to each wireless base station to adjoining wireless base stations through the wireless base station interface function unit; and a second notification information transmission unit which transmits second notification information, which includes the number of wireless base stations included in the belonging information management table of said one wireless base station together with the respective incremented update numbers and the number of belonging terminals corresponding to each wireless base station, to all the other wireless base stations through the wireless base station interface function unit, when finding an old update status of the belonging information management table in other wireless base stations indicated by the periodical transmission information, wherein the belonging information update unit updates, when the second notification information is received from other wireless base station, the belonging information management table stored in said one wireless base stations based on the second notification information.

2. The wireless base station according to claim 1, wherein the second notification information transmission unit calculates a waiting time for transmitting the second notification information by a predetermined calculation method, and transmits the second notification information after elapsed the waiting time without receiving the second notification information from the other wireless base station, when finding the old update status of the belonging information management table of other wireless base station indicated by the periodical transmission information.

3. The wireless base station according to claim 1, wherein, the belonging information update unit updates the belonging information of said one wireless base station when a change in the belonging status of the terminal being moved from other wireless base station has been detected by corresponding information received through the terminal interface function unit, and further comprising:

a third notification information transmission unit which transmits third notification information, which includes the updated portion in the belonging information due to movement of the terminal together with information about the moved terminal and the wireless base station to which the terminal belonged before movement, to all other wireless base stations through the wireless base station interface function unit, when the belonging information of said one wireless base station is updated due to movement of the terminal, wherein when receiving the third notification information from other wireless base station and finding that said one wireless base station is the wireless base station to which the moved terminal belonged before movement, the belonging information update unit updates the belonging information by deleting the terminal notified by the third notification information and transmits the first notification information including the updated portion in the belonging information to all other wireless base stations through the wireless base station interface function unit.

4. The wireless base station according to claim 1, wherein, when a data is not received from the terminal belonging to said one wireless base station in a predetermined time, the belonging information update unit deletes the belonging information corresponding to the terminal.

5. The wireless base station according to claim 1, further comprising a synchronization unit which confirms, when the update numbers in the belonging information management table are initialized, each update number based on the information received from other wireless base station in a predetermined time.

6. The wireless base station according to claim 1, further comprising:

a search request unit which transmits search request information including information on a destination terminal for performing search request to all other wireless base stations through the wireless base station interface function unit, when a parent wireless base station of the destination terminal for communication is unknown, and a fourth notification information transmission unit which transmits, when receiving the search request information and finding the destination terminal belongs to said one wireless base station, the first notification information including the belonging information about the destination terminal to all other wireless base stations through the wireless base station interface function unit.

7. The wireless base station according to claim 1, wherein the terminal belonging to the wireless base station is connected to the terminal interface function unit in wired or wireless fashion.

8. A communication system of a wireless meshed network comprising:

a plurality of wireless base stations composing the wireless meshed network by communicating each other in a wireless fashion; and a plurality of terminals which arbitrarily move and belong to the wireless base stations, and wherein each of the wireless base stations comprises:
i) a belonging information management table which stores belonging information of the terminal in each of the wireless base stations with an update number, which update number is incremented by one (1) whenever the belonging information is updated, for judgment of new or old of an update state of the belonging information,
ii) a belonging information update unit which updates the belonging information of said one wireless base station when a change in a belonging status of the terminal has been detected,
iii) a first notification information transmission unit which transmits, when the belonging information is updated, notification information for notifying update including an updated portion in the belonging information together with the incremented update number to all other wireless base stations,
iv) a periodical information transmission unit which transmits periodical transmission information including a number of wireless base stations included in the belonging information management table of said one wireless base station together with respective incremented update numbers corresponding to each wireless base station to adjoining wireless base stations, and
v) a second notification information transmission unit which transmits second notification information, which includes the number of wireless base stations included in the belonging information management table of said one wireless base station together with the respective incremented update numbers and a number of belonging terminals corresponding to each wireless base station, to all other wireless base stations, when finding old update status of the belonging information management table in other wireless base stations indicated by the periodical transmission information,
wherein the belonging information update unit updates, when the first notification information or the second notification information is received from other wireless base station, the belonging information management table stored in said one wireless base stations based on the first notification information or the second notification information.

9. A belonging information management method in a wireless meshed network in which a terminal arbitrarily belongs to a wireless base station which composes the wireless meshed network, comprising:
a management table storing step for storing a belonging information management table which includes belonging information of the terminal in each of the wireless base station with an update number, which update number is incremented by one (1) whenever the terminal is added or deleted in the belonging information, for judgment of new or old of an update state of the belonging information;
a first belonging information updating step for updating the belonging information of said one wireless base station when a change in a belonging status of the terminal due to addition or deletion has been detected by corresponding information received from the terminal;
a first notification information transmitting step for transmitting, when the belonging information is updated, first notification information including an updated portion in the belonging information together with the incremented update number to all other wireless base stations;
a second belonging information updating step for updating, when the first notification information is received from other wireless base station, the belonging information management table stored in said one base station based on the first notification information;
a periodical information transmitting step for transmitting periodical transmission information including a number of wireless base stations included in the belonging information management table of said one wireless base station together with respective incremented update numbers corresponding to each wireless base station to adjoining wireless base stations;
a second notification information transmitting step for transmitting second notification information, which includes the number of wireless base stations included in the belonging information management table of said one wireless base station together with the respective incremented update numbers and a number of belonging terminals corresponding to each wireless base station, to all other wireless base stations, when finding old update status of the belonging information management table in other wireless base stations indicated by the periodical transmission information; and
a third belonging information updating step for updating, when the second notification information is received from other wireless base station, the belonging information management table stored in said one wireless base stations based on the second notification information.

10. The belonging information management method according to claim 9, wherein the second notification information transmitting step includes:
calculating a waiting time for transmitting the second notification information by a predetermined calculation method, and
transmitting the second notification information after elapsed the waiting time without receiving the second notification information from the other wireless base station, when finding old update status of the belonging information management table of other wireless base station indicated by the periodical transmission information.

11. The belonging information management method according to claim 9, wherein the first belonging information updating step includes, updating the belonging information of said one wireless base station when a change in the belonging status of the terminal being moved from other wireless base station has been detected by corresponding information received from the terminal, and further comprising:
a third notification information transmitting step for transmitting third notification information, which includes the updated portion in the belonging information due to movement of the terminal together with information about the moved terminal and the wireless base station to which the terminal belonged before movement, to all other wireless base stations, when the belonging information of said one wireless base station is updated due to movement of the terminal; and
a fourth belonging information updating step for updating, when receiving the third notification information from other wireless base station and finding that said one wireless base station is the wireless base station to which the moved terminal belonged before movement, the belonging information by deleting the terminal notified by the third notification information and transmitting the first notification information including the updated portion in the belonging information to all other wireless base stations.

12. The belonging information management method according to claim 9, wherein, when a data is not received from the terminal belonging to said one wireless base station in a predetermined time, the further step of deleting the belonging information corresponding to the terminal.

13. The belonging information management method according to claim 9, further comprising:
   a synchronizing step for confirming, when the update numbers in the belonging information management table are initialized, each update number based on the information received from other wireless base station in a predetermined time.

14. The belonging information management method according to claim 9, further comprising:
   a search requesting step for transmitting search request information including information on a destination terminal for performing search request to all other wireless base stations, when a parent wireless base station of the destination terminal for communication is unknown; and
   a fourth notification information transmitting step for transmitting, when receiving the search request information and finding the destination terminal belongs to said one wireless base station, the first notification information including the belonging information about the destination terminal to all other wireless base stations.

15. A non-transitory computer-readable recording medium having embodied thereon a computer program, for a wireless base station composing a wireless meshed network in which a terminal arbitrarily moves, which causes a computer to execute belonging information management processing of a belonging information management table which includes belonging information of the terminal in each of the wireless base stations in the wireless meshed network with an update number, which is incremented by one (1) whenever the terminal is added or deleted in the belonging information, for judgment of new or old of an update state of the belonging information, comprising:
   a first belonging information updating processing for updating the belonging information of a corresponding one wireless base station when a change in a belonging status of the terminal due to addition or deletion has been detected;
   a first notification information transmitting processing for transmitting, when the belonging information is updated, first notification information including an updated portion in the belonging information together with the incremented update number to all other wireless base stations;
   a second belonging information updating processing for updating, when the first notification information is received from other wireless base station, the belonging information management table stored in said one base station based on the first notification information;
   a periodical information transmitting processing for transmitting periodical transmission information including a number of wireless base stations included in the belonging information management table of said one wireless base station together with respective incremented update numbers corresponding to each wireless base station to adjoining wireless base stations;
   a second notification information transmitting processing for transmitting second notification information, which includes the number of wireless base stations included in the belonging information management table of said one wireless base station together with the respective incremented update numbers and a number of belonging terminals corresponding to each wireless base station, to all other wireless base stations, when finding old update status of the belonging information management table in other wireless base stations indicated by the periodical transmission information; and
   a third belonging information updating processing for updating, when the second notification information is received from other wireless base station, the belonging information management table stored in said one wireless base stations based on the second notification information.

16. The non-transitory computer-readable recording medium according to claim 15, wherein the second notification information transmitting processing includes,
   a processing of calculating a waiting time for transmitting the second notification information by a predetermined calculation method, and
   a processing of transmitting the second notification information after elapsed the waiting time without receiving the second notification information from the other wireless base station, when finding old update status of the belonging information management table of other wireless base station indicated by the periodical transmission information.

17. The non-transitory computer-readable recording medium according to claim 15, wherein the first belonging information updating processing includes, a processing of updating the belonging information of said one wireless base station when a change in the belonging status of the terminal being moved from other wireless base station has been detected by corresponding information received from the terminal, and further comprising:
   a third notification information transmitting processing for transmitting third notification information, which includes the updated portion in the belonging information due to movement of the terminal together with information about the moved terminal and the wireless base station to which the terminal belonged before movement, to all other wireless base stations, when the belonging information of said one wireless base station is updated due to movement of the terminal; and
   a fourth belonging information updating processing for updating, when receiving the third notification information from other wireless base station and finding that said one wireless base station is the wireless base station to which the moved terminal belonged before movement, the belonging information by deleting the terminal notified by the third notification information and transmitting the first notification information including the updated portion in the belonging information to all other wireless base stations.

18. The non-transitory computer-readable recording medium according to claim 15, wherein, when a data is not received from the terminal belonging to said one wireless base station in a predetermined time, deleting the belonging information corresponding to the terminal.

19. The non-transitory computer-readable recording medium according to claim 15, further comprising:
   a synchronizing processing for confirming, when the update numbers in the belonging information management table are initialized, each update number based on the information received from other wireless base station in a predetermined time.

20. The non-transitory computer-readable recording medium according to claim 15, further comprising:
   a search requesting processing for transmitting search request information including information on a destination terminal for performing search request to all other wireless base stations, when a parent wireless base station of the destination terminal for communication is unknown, and a fourth notification information transmitting processing for transmitting, when receiving the search request information and finding the destination terminal belongs to said one wireless base station, the first notification information including the belonging information about the destination terminal to all other wireless base stations.

21. A wireless base station composing a wireless meshed network in which a plurality of terminals arbitrarily move between a number of wireless base stations, said wireless base station comprising:

a terminal interface function means for communicating with the terminal belonging to said one wireless base station;

a wireless base station interface function means for communicating with other wireless base stations composing the wireless meshed network;

a management table storage means for storing a belonging information management table which includes belonging information of a terminal in each of the wireless base stations with an update number, which is incremented by one (1) whenever the terminal is added or deleted in the belonging information, for judgment of new or old of an update state of the belonging information;

a belonging information update means for updating the belonging information of said one wireless base station when a change in a belonging status of the terminal due to addition or deletion has been detected by corresponding information received through the terminal interface function means;

a first notification information transmission means for transmitting, when the belonging information is updated, first notification information including an updated portion in the belonging information together with the incremented update number to all other wireless base stations through the wireless base station interface function means, wherein the belonging information update means updates, when the first notification information is received from other wireless base station, the belonging information management table stored in said one base station based on the first notification information;

a periodical information transmission means for transmitting periodical transmission information including the number of wireless base stations included in the belonging information management table of said one wireless base station together with respective update numbers corresponding to each wireless base station to adjoining wireless base stations through the wireless base station interface function means; and a second notification information transmission means for transmitting second notification information, which includes the number of wireless base stations included in the belonging information management table of said one wireless base station together with the respective update numbers and the number of belonging terminals corresponding to each wireless base station, to all the other wireless base stations through the wireless base station interface function means, when finding an old update status of the belonging information management table in other wireless base stations indicated by the periodical transmission information, wherein the belonging information update means updates, when the second notification information is received from other wireless base station, the belonging information management table stored in said one wireless base stations based on the second notification information.

* * * * *